INVENTOR
JAMES G. MILES
ROBERT M. KALB

BY Cushman, Darby & Cushman
ATTORNEY

INVENTORY DIGITAL STORAGE AND COMPUTATION APPARATUS

Filed Nov. 13, 1951 14 Sheets-Sheet 2

INVENTOR
JAMES G. MILES
ROBERT M. KALB
BY Cushman, Darby & Cushman
ATTORNEY

Oct. 27, 1959 J. G. MILES ET AL 2,910,238

INVENTORY DIGITAL STORAGE AND COMPUTATION APPARATUS

Filed Nov. 13, 1951 14 Sheets-Sheet 3

INVENTOR
JAMES G MILES
ROBERT M. KALB

BY Cushman, Darby & Cushman
ATTORNEY

INVENTORY DIGITAL STORAGE AND COMPUTATION APPARATUS

Filed Nov. 13, 1951 14 Sheets-Sheet 4

INVENTOR
JAMES G. MILES
ROBERT M. KALB

BY Cushman, Darby & Cushman

ATTORNEY

INVENTORY DIGITAL STORAGE AND COMPUTATION APPARATUS

Filed Nov. 13, 1951 14 Sheets-Sheet 5

INVENTOR
JAMES G. MILES
ROBERT M. KALB

BY Cushman, Darby & Cushman
ATTORNEY

Fig 7.

CHART OF CATALOG DRUM SURFACE

| INDEX NUMBER | GROUP NUMBER | TRIP NUMBER | SEQUENCE NUMBER | FLIGHT NUMBER | FLIGHT LEGS INVOLVED 1 | 2 | 3 | 4 | 5 |
|---|---|---|---|---|---|---|---|---|---|
| 301 | 16 | 16 | 2 | 603 | | X | X | X | X |
| 302 | 16 | 17 | 10 | 7 | | | X | | |
| 303 | 16 | 18 | 18 | 113 | | X | X | X | |
| 304 | 16 | 19 | 15 | 327 | | X | X | X | X |
| 305 | 16 | 20 | 13 | 11 | | | X | X | |
| 306 | 17 | 1 | 15 | 603 | | X | | | |
| 307 | 17 | 2 | 5 | 1 | | X | | | |
| 308 | 17 | 3 | 9 | 363 | | X | | | |
| 309 | 17 | 4 | 7 | 321 | | X | X | X | |
| 310 | 17 | 5 | 3 | 659 | | X | | | |
| 311 | 17 | 6 | 6 | 165 | | X | X | | |

Fig 8.

CHART OF STORAGE DRUM SURFACE

| INDEX NO. | DATE | FLIGHT NO. | PLANE CAP. | SEATS AVAILABLE LEG 1 | LEG 2 | LEG 3 | LEG 4 | LEG 5 | LEG |
|---|---|---|---|---|---|---|---|---|---|
| 2101 | 29 | 90 | 60 | 28 | 21 | 17 | 60 | 60 | |
| 2102 | 30 | 90 | 60 | 17 | 36 | 28 | 60 | 59 | |
| 2103 | 31 | 90 | 60 | 40 | 56 | 49 | 55 | 52 | |
| 2104 | A | 90 | 60 | 56 | 54 | 58 | 66 | 60 | |
| 2105 | B | 90 | 60 | 60 | 55 | 55 | 43 | | |
| 2106 | C | 90 | 60 | 60 | 60 | 59 | 58 | | |
| 2107 | D | 90 | 60 | 60 | 60 | 60 | | | |
| 2108 | E | 90 | 60 | 60 | 55 | 43 | | | |
| 2109 | 1 | 492 | 44 | 41 | 47 | | | | |
| 2110 | 2 | 492 | 44 | 41 | | | | | |

INVENTOR
JAMES G. MILES
ROBERT M. KALB

BY Cushman, Darby & Cushman
ATTORNEYS

INVENTORY DIGITAL STORAGE AND COMPUTATION APPARATUS

INVENTOR
JAMES G. MILES
ROBERT M. KALB

BY Cushman, Darby & Cushman
ATTORNEYS

INVENTOR
JAMES G. MILES
ROBERT M. KALB

BY Cushman, Darby & Cushman
ATTORNEYS

INVENTORY DIGITAL STORAGE AND COMPUTATION APPARATUS

Filed Nov. 13, 1951 14 Sheets-Sheet 9

INVENTOR
JAMES G. MILES
ROBERT M. KALB

BY Cushman, Darby & Cushman
ATTORNEY

Oct. 27, 1959 J. G. MILES ET AL 2,910,238

INVENTORY DIGITAL STORAGE AND COMPUTATION APPARATUS

Filed Nov. 13, 1951 14 Sheets-Sheet 10

INVENTOR
JAMES G. MILES
ROBERT M. KALB

BY Cushman, Darby & Cushman
ATTORNEY

INVENTORY DIGITAL STORAGE AND COMPUTATION APPARATUS

Filed Nov. 13, 1951 14 Sheets-Sheet 11

INVENTOR
JAMES G. MILES
ROBERT M. KALB
BY Cushman, Darby & Cushman
ATTORNEY

INVENTOR
JAMES G. MILES
ROBERT M KALB

BY Cushman, Darby & Cushman
ATTORNEYS

INVENTOR
James G. Miles
Robert M. Kalb
BY Cushman, Darby & Cushman
ATTORNEY

Oct. 27, 1959 J. G. MILES ET AL 2,910,238

INVENTORY DIGITAL STORAGE AND COMPUTATION APPARATUS

Filed Nov. 13, 1951 14 Sheets-Sheet 14

INVENTOR

JAMES G. MILES

ROBERT M. KALB

BY Cushman, Darby & Cushman

ATTORNEY 2,910,238
Patented Oct. 27, 1959

2,910,238

INVENTORY DIGITAL STORAGE AND COMPUTATION APPARATUS

James G. Miles and Robert M. Kalb, Minneapolis, Minn., assignors, by mesne assignments, to Sperry Rand Corporation, New York, N.Y., a corporation of Delaware Application November 13, 1951, Serial No. 255,967

2 Claims. (Cl. 235—167)

The present invention relates to data storage systems and particularly to storage systems involving the keeping of inventories, records of reservations, and the like.

In greater detail, the present invention relates to methods and apparatus for use in recording, altering, computing and transmitting information regarding the quantities on hand of each item of an inventory or the like. The invention is particularly adapted to handle a great number of items rapidly and provides control of the system either locally or from a plurality of remote stations.

It is realized that systems are presently known for disseminating information regarding the status of an inventory or the like, but in all known arrangements the dissemination of information is limited to sending the existing information out from a central station and does not include any ability to record, alter and/or compute from information in the central station.

Accordingly, an object of the present invention is to provide an improved inventory or like system.

A further object of the present invention is to provide an improved inventory system in which data may be automatically recorded or altered at a central station by means of commands originating in remote stations.

A further object of the present invention is to provide an inventory system in which new and revised information may be automatically computed.

A further object of the present invention is to provide an inventory system for space reservation such as airline seat reservations.

A further object of the present invention is to provide an inventory keeping system, such as a space reservation system, in which indication is available during execution of transactions that items or space are sold out or oversold, that item cancellations have exceeded possible cancellations, or that waiting lists exist or are closed.

Further objects and the entire scope of our invention will become further apparent from the following detailed description and from the appended claims.

The invention may be further understood with reference to the accompanying drawings, in which.

Figure 6A:
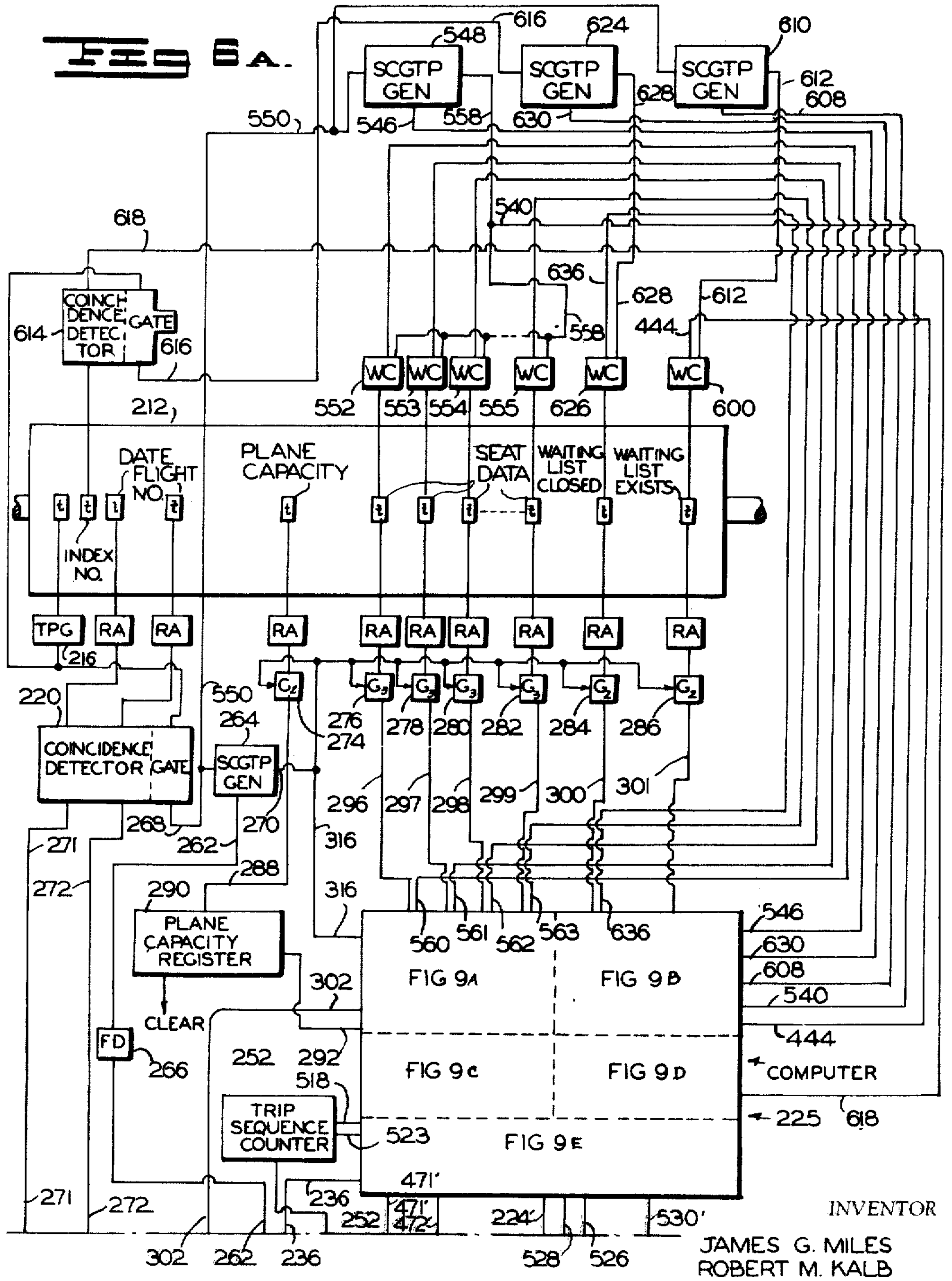
Figure 6B:
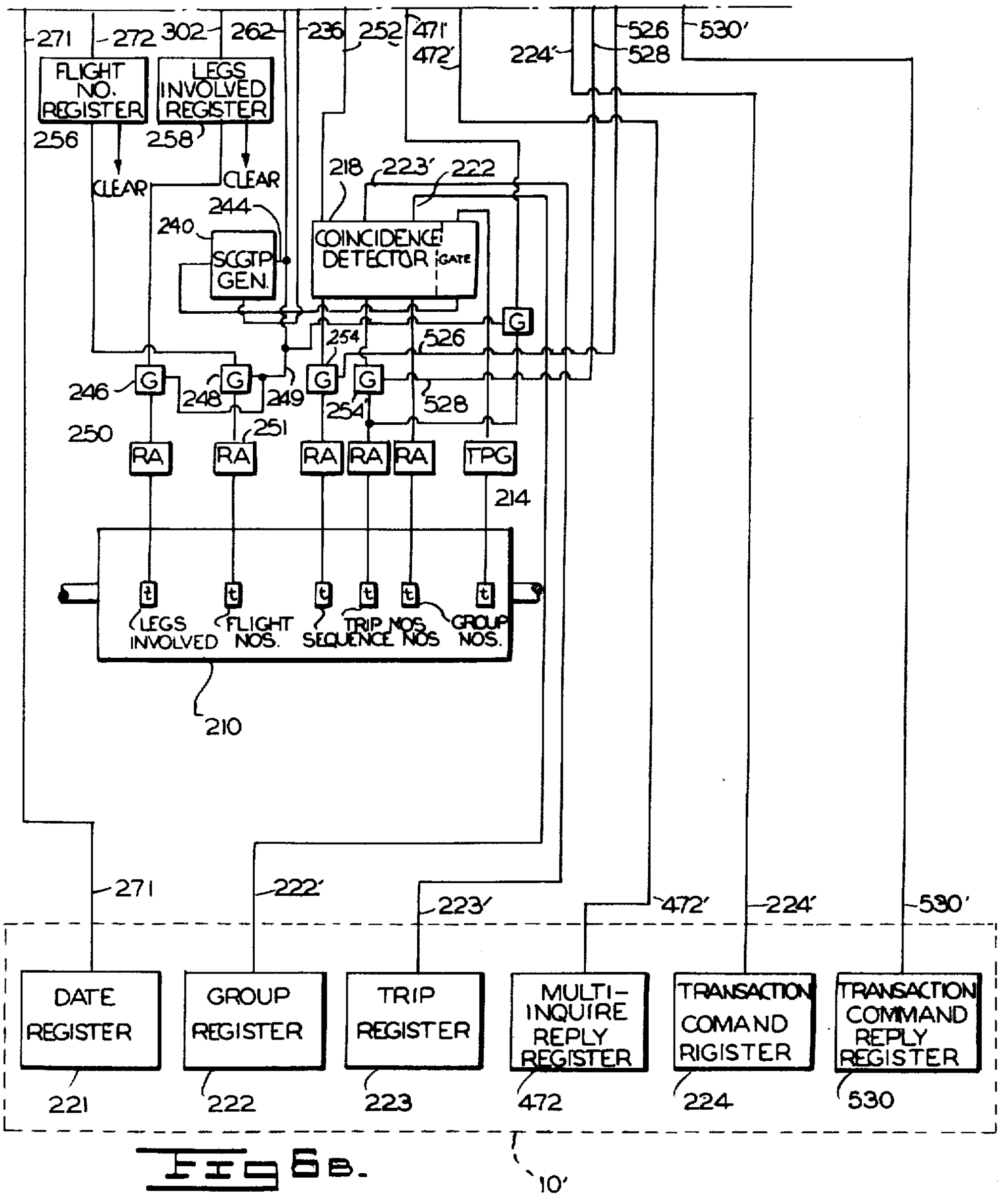

Figures 6A and 6B combined show a block diagram of a system according to the invention, including circuits for automatic computation.

Figure 7 shows a chart of information contained in a catalog drum employed in the invention.

Figure 8 shows a chart of information in a storage drum employed in the invention.

Figures 9A, 9B, 9C, 9D, and 9E combined show a block diagram of a computer section of the invention.

Figure 10:
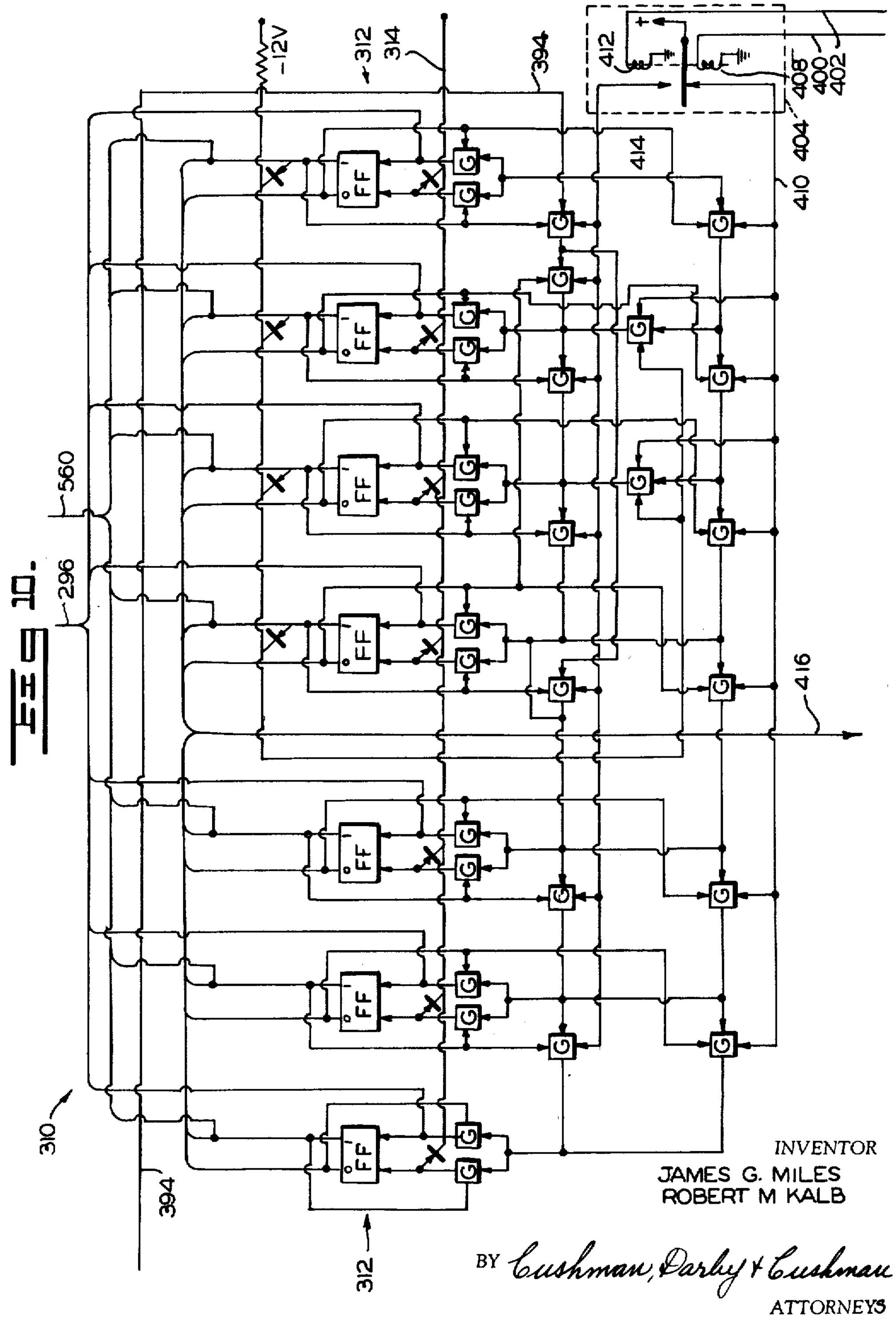

Figure 10 shows a block diagram of a counter employed in the invention.

Figure 11:
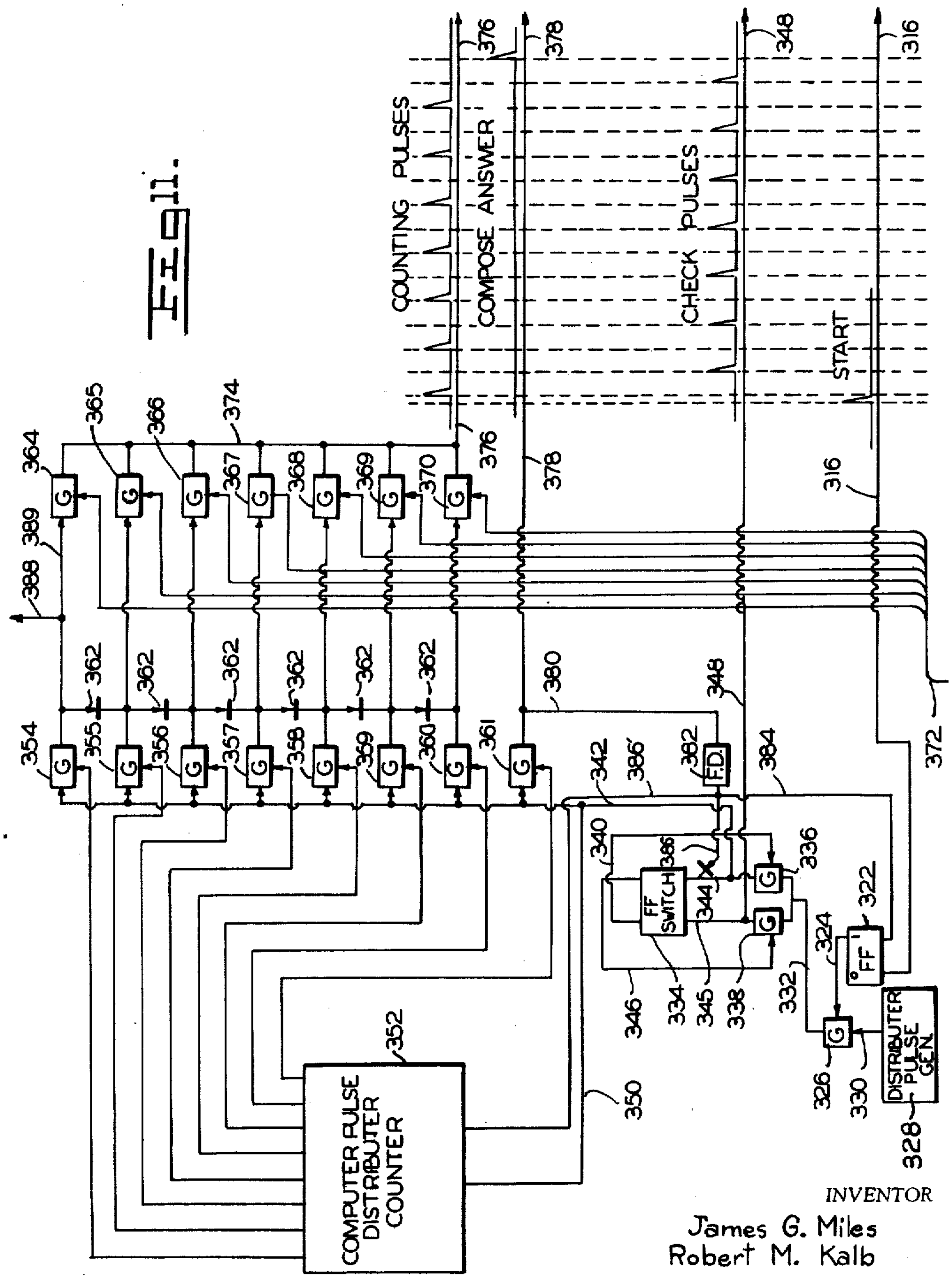

Figure 11 shows a block diagram of a pulse distributor employed in the invention.

Figure 12:
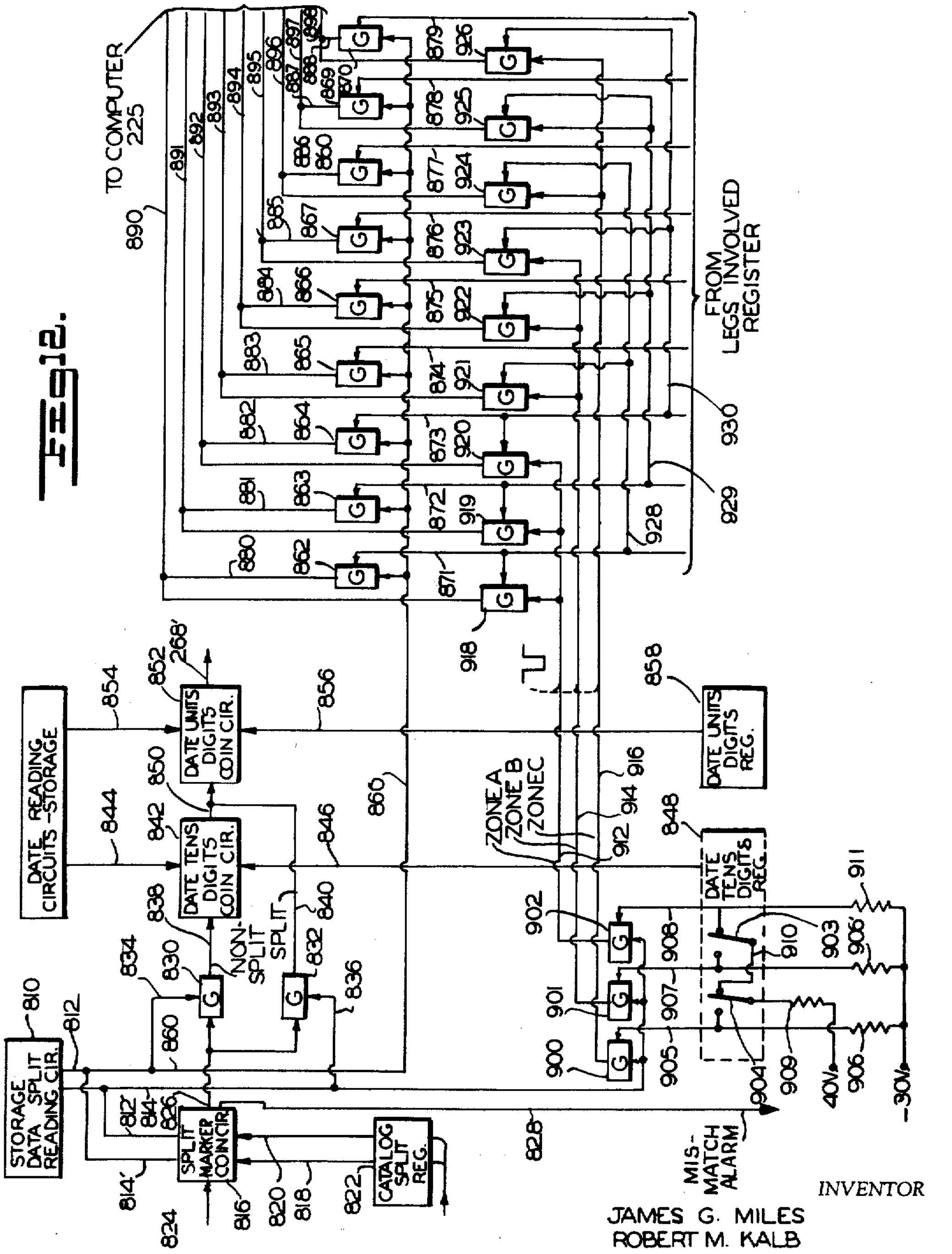

Figure 12 is a circuit diagram relating to a "data split" feature of the invention.

The invention will be described primarily in its application to a space reservation system, this being a relatively complex illustration of an inventory system according to the invention. The particular example will be an airline reservation system. However, it will be understood throughout this specification that an airline reservation system is employed only as an example, and it is not intended that the scope of the invention will be limited to such system.

Figure 1:
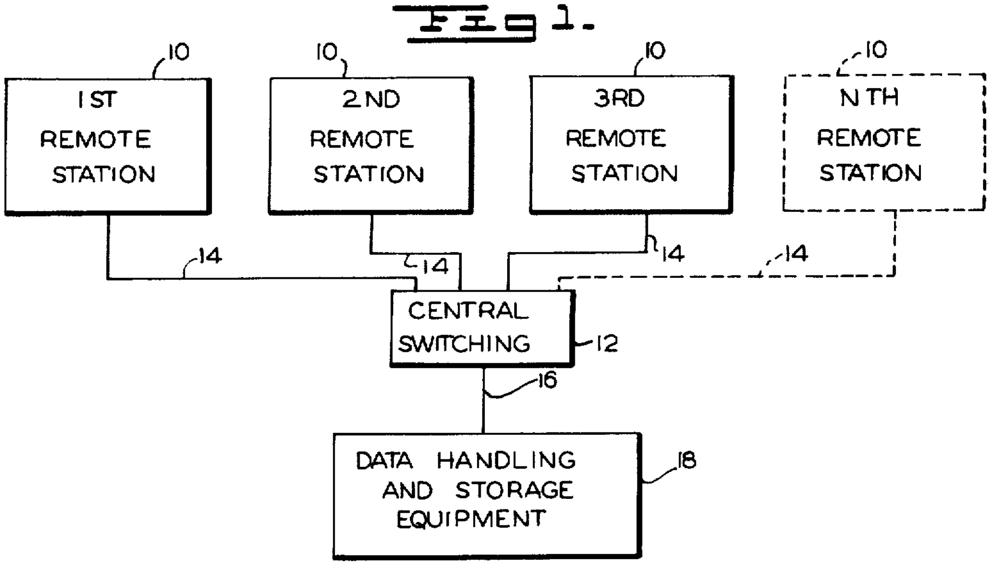
Figure 1 shows a block diagram of a system according to the invention.

Referring to Figure 1, a system embodying the invention is illustrated in general form by means of a block diagram. Blocks representing *n* remote control stations are represented by reference characters 10. The remote control stations 10 are indicated as connected to a central switching station 12 over transmission lines 14. From the central switching station 12 the selected line 14 is connected over a trunk line 16 to a block 18 comprising data handling and storage equipment employed in the handling of the information available on the line 16.

In practice, each line 14 will sometimes consist of several conductors, and at least one conductor may be for the purpose of controlling the switching equipment 12. The switching equipment 12 will not be described in detail herein, it being understood that this equipment per se forms no part of the present invention. It is considered sufficient to state that the switching equipment may be of the type commonly employed in telephone switching. Where several conductors in lines 14 are not desired, a lesser number may be employed on a time-sharing or multi-carrier wave principle. The line 16 will usually be the same as to conductors as the lines 14.

Figure 2:
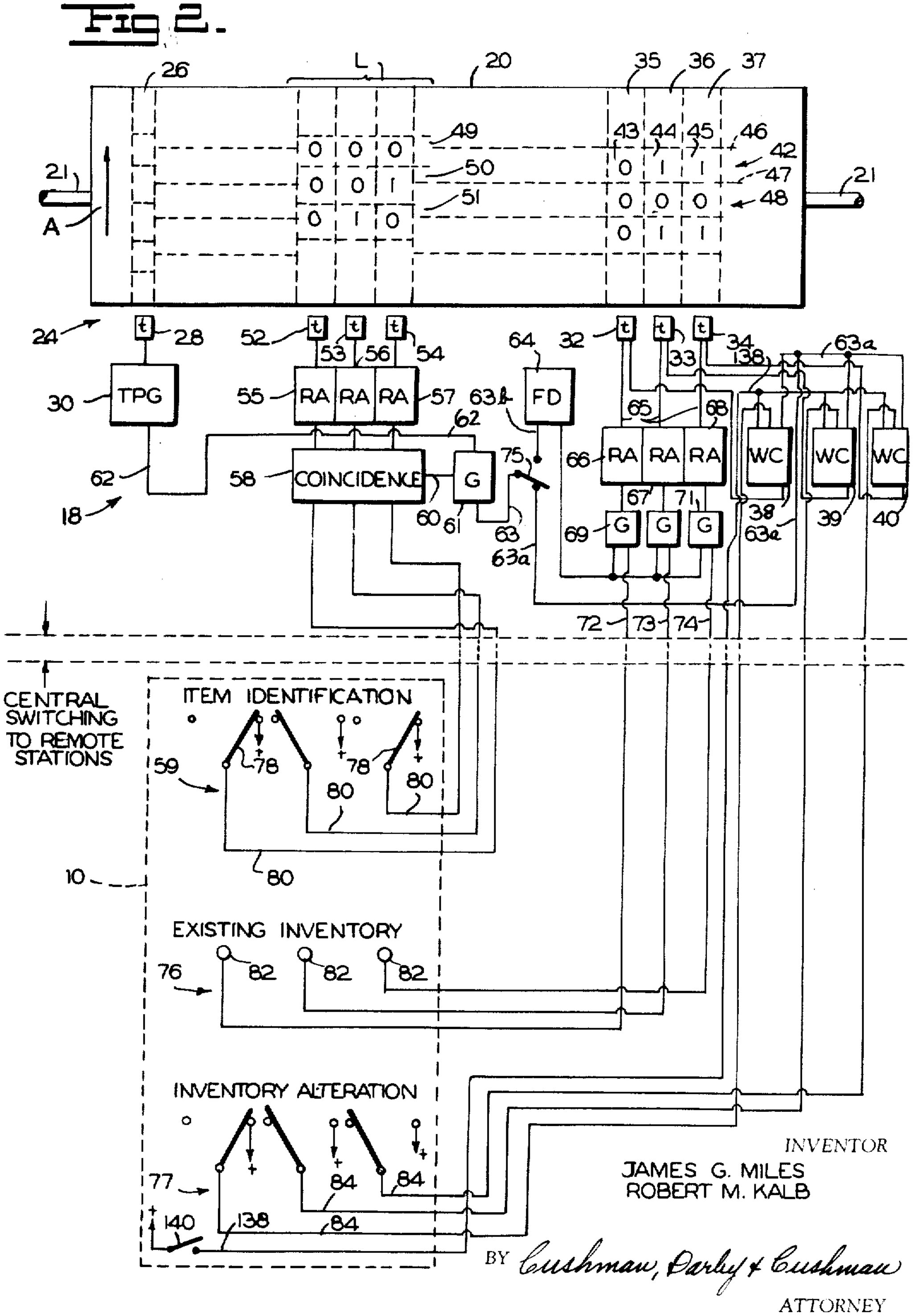
Figure 2 shows a block diagram of the system of Figure 1, showing the remote stations and data handling and storage equipment in greater detail.

A description of the data handling and storage unit 18 and its cooperation with remote control stations will now be given. Referring to Figure 2, a magnetizable member in the form of a drum 20 is illustrated, the drum being rotatable on shaft 21 which extends from the ends of the drum. A motor (not shown) will be arranged to continuously rotate the drum. This drum is of a type which is covered with a magnetizable material and is operated in conjunction with associated magnetic heads or transducers (legend *t* on drawing) indicated generally as 24. Each of the transducers 24 is arranged to be positioned closely adjacent the surface of the drum 20 and in such position lengthwise of the drum that each transducer will sweep out a separate track or path on the surface of the drum as the drum is rotated. This arrangement is such that, when a short pulse of current is applied to a writing coil of a transducer, a pattern of magnetic flux will be induced into the magnetizable coating of the drum. This flux pattern may be termed a "spot" occupying a "cell" along a track. While the magnetizable surface of the drum 20 may be continuous over the entire area and have no visible markings thereon, the transducers, nevertheless, will sweep out the tracks which have imaginary boundaries and the application of pulses of current to the transducers will result in the similarly invisible flux patterns in cells along the tracks. The recording, reading and altering of information on the surface of a magnetizable drum, as just explained, has been previously described in the following copending patent applications: Application of J. M. Coombs and C. B. Tompkins, Serial No. 16,997, filed March 25, 1948, and now Patent No. 2,617,705; application of A. A. Cohen, W. R. Keye, and C. B. Tompkins, Serial No. 16,998, filed March 25, 1948, and now Patent No. 2,540,654; application of J. M. Coombs, Serial No. 90,941, filed May 2, 1949, now abandoned; application of A. A. Cohen, J. L. Hill and R. M. Kalb, Serial No. 175,832, filed July 24, 1950, and now Patent No. 2,614,169, and application of A. P. Hendrickson, W. R. Keye, and J. H. Howard, Serial No. 203,612, filed December 30, 1950, now Patent No. 2,771,595, and application of W. J. Field and R. L. Perkins, Serial No. 118,034, filed September 27, 1949, and now Patent No. 2,660,622. It is intended that the descriptive material in these applications be considered as incorporated in the present application.

It will be apparent that, instead of a drum, a magnetizable tape, belt, disk, or the like, may also be employed. However, for convenience below, the magnetizable member is referred to as a drum.

As may be understood in detail from the just mentioned patent applications, one track of the drum, such as track 26, in Figure 2, may have recorded therein a series of equally spaced flux patterns of substantially equal value and orientation. Accordingly, as the drum is rotated, transducer 28, operating in track 26, will produce a series of electrical pulses which re-occur at equal intervals in relation to travel of the drum surface. These pulses, which are thus synchronized with the drum, may be applied to a timing pulse generating circuit 30 which performs the function of shaping (and if desired, multiplying) the pulses derived from transducer 28 to provide a train of sharp timing pulses equal in number to the number of flux cells to be established in data tracks about the periphery of the drum. Suitable circuits for generating the timing pulses will be apparent to those skilled in the art, and representative circuits also may be found in the above mentioned patent applications.

Other suitable means for generating timing pulses in synchronism with the drum rotation are also available. For example, a milled track may be employed, as set out in application Ser. No. 203,612, now Patent. No. 2,771,-595, referred to above.

Data transducers 32, 33, and 34, are arranged to operate in associated tracks 35, 36, and 37, of the drum, which tracks may be termed data tracks. Each of the just mentioned transducers may have a winding connected to writing circuits 38, 39, and 40, which circuits will produce a short pulse of current when triggered. Accordingly, if the triggering means of a writing circuit 38–40 is actuated by a timing pulse generated in circuit 30, a flux pattern or cell will be established at a predetermined position on the periphery of the drum. Accordingly, it will be clear that, by the use of timing pulses, cells may be established at predetermined positions along each of the tracks of the drum. Moreover, by use of the timing pulses, these cells may be subsequently again located and the transducers enabled either to read or record information in the same cells. The construction of the transducers may be as set out in application Ser. No. 118,034, now Patent No. 2,660,622, referred to above.

While only three data tracks 35, 36, and 37, are illustrated in Figure 2, it will be understood throughout this specification that a greater number of tracks may be employed if desired. As will be explained immediately below, a combination of cells, one in each of a group of tracks carries an item of information in binary coded form. Thus, to establish items, such as high numbers made up of several bits of information, a large number of tracks will be necessary. More specifically, companion cells in the various data tracks may go to make up a "row" of cells. According to the above mentioned patent applications, and as further described hereinbelow, each of these cells may contain either a "0" or a "1," a "0" meaning that a flux spot has its flux oriented in a first direction and a "1" meaning that a second flux spot has its flux oriented in a second direction. Since two states are available, the data is stored in a binary coded fashion.

Companion cells which go to make up a row of cells containing a binary coded piece of data may most readily be considered as cells which are aligned perpendicular to the direction of the tracks on the drum surface. That is, referring to Figure 2, a data row 42 may be made up of cells 43, 44, and 45. Cells 43–45 may be considered as bounded by the dash lines 46 and 47, the just mentioned lines being parallel to the axis (shaft 21) of the drum. The next "following" row of cells will be row 48, and so forth. Row 48 will follow row 42 because the drum 20 will be rotated clockwise, as viewed from the right-hand end in Figure 2.

The data transducers 32–34 may lie along a line which is also parallel to the axis of the drum, and, therefore, cells 43–45 will simultaneously pass beneath the transducers 32–34. Thus, if the writing circuits 38–40 of transducers 32–34 are simultaneously triggered by reason of a timing pulse derived from generator 30, the writing circuits will write in the cells 43–45. However, notwithstanding the foregoing descriptive definition of rows, based upon physical alignment of the cells 43–45, it will be apparent that if the transducers 32–34 are variously positioned at points about the periphery of the drum, as in a helix or the like, all that is necessary is to have the cells 43–45 correspondingly oriented in relation to each other about the drum and a "row" is still available. That is, so long as the orientation of transducers and cells corresponds, signals will be available at the transducer outputs simultaneously. This latter situation may be termed "electrical alignment." Normally, the flux in the cells will actually be created by operation of the transducers, and, therefore, automatically correspond in alignment.

As a preferred means of locating predetermined rows of cells in the data storage portion of the drum, a plurality of tracks may be devoted to containing flux patterns representing address information. That is, according to the above mentioned patent application of Hendrickson et al., a plurality of locator tracks included within the bracket L in Figure 2 may contain rows of cells of binary coded flux patterns representing numbers. In greater detail, in Figure 2, locator row 49 contains binary number 0, the next row 50 contains the binary number 1, and the next row 51 contains the binary number 2, and so forth. Again, the sequence of rows is based upon the direction of rotation of drum 20, as above stated. This direction is also indicated by arrow A in Figure 2. As the drum rotates, the row 49 will eventually pass adjacent a row of aligned locator transducers indicated as 52, 53, and 54. When row 49 is passing adjacent the transducers, voltages will be introduced in the transducer windings, the direction or polarity of these voltages being determined by the binary identity of the cells along the row 49. As is explained in detail in the above mentioned application of Hendrickson et al., reading amplifiers, indicated as 55, 56, and 57, will supply a coincidence detecting circuit 58 with a set of voltages indicating the identity of the flux patterns in row 49 which are passing beneath the transducers 52–54. If the other input of the coincidence circuit is supplied with signals which will establish a corresponding or complementary set of voltages from an item identification register 59 (located in a remote station 10) a coincidence pulse will be available over line 60 which is connected to the output of the coincidence circuit 58. Line 60 may be connected as a first input to a gate circuit 61 which has its second input supplied over line 62, which latter line is connected to the output of timing pulse generator 30. A suitable coincidence detector circuit may be understood with reference to the above mentioned application of Hendrickson et al., and a representative adaptation of such circuit will be described hereinbelow. Accordingly, when a row, such as row 49, selected at register 59, is passing beneath the transducers 52–54, a single gated transfer pulse appearing on line 63 may then be applied over a line 63(*a*) to trigger the previously mentioned writing circuits 38—40 to write in the data cells which are identified with the particular locator row which has activated the coincidence circuit 58. As indicated in Figure 2, each row of data cells normally will be located about one-half cell length behind the companion timing pulse cell and row of locator cells. This is due to the fact that the coincidence gated timing pulse on line 63(*a*) will not be produced until the timing cell and the cells of the locator rows are substantially centered beneath their respective transducers.

The transducers 32–34 are also provided with a reading winding (in addition to the writing winding) and these windings connect over lines 65 to reading amplifiers 66, 67, and 68, which can detect the binary nature of the flux pattern in the cells of the track in which a particular transducer is operating. Therefore, when it is desired to determine the identity of a particular cell in a data track, the output of reading amplifiers 66, 67, and 68, may be sampled upon the occurrence of a gated timing pulse. Sampling may be carried out by applying a gated transfer pulse on a line 63(*b*), preferably through a reading fixed delay circuit 64 to gates 69, 70, and 71. The reading amplifiers 66–68 will be constantly detecting the identity of the cells passing beneath the transducers 32–34, respectively, and, therefore, when the gates 69–71 are momentarily opened by reason of a gated transfer pulse, signals representing the binary nature of the particular row of cells will be available over output lines 72, 73, and 74, connected to the output of the gates 69–71, respectively.

The purpose of the reading fixed delay circuit 64 is to delay the sampling pulse on line 63(*b*), so that gates 69–71 will not be opened until the row of data cells is substantially centered beneath the transducers 32–34. That is, since a similarly "located" pulse on line 63 is employed over line 63(*a*) to establish the cells, the cells, as stated above, will be a fraction of a cell length behind the timing cell and locator cells. Therefore, a delay in reading is preferable to sample the output of reading circuits 69–71 to obtain maximum output voltages of the latter. It will be understood, however, that a delay is not absolutely required if the sampling pulse is permitted to be broad enough to tolerate a delay in obtaining an output voltage from transducers 32–34.

To alter the information in any cell, it is simply necessary to write in the cell with a flux of opposite polarity to the flux previously present. That is, if row 42 is to be changed from 0–1–1, as shown in Figure 2, to become 1–0–0, writing circuit 38 will be set to write a 1, and writing circuits 39 and 40 will be set to write 0's. This technique is termed selective alteration and is fully described in the above mentioned patent applications and patents.

From the previous description, it will be understood that for a given setting of the item identification register 59, a particular row of cells on the drum surface will be located and either a new or replacement flux may be written into these particular cells by means of writing circuits 38–40 or the previously existing contents of the particular cells may be read by means of the reading amplifiers 66–68 and the reading gates 69–71.

Whether a reading or a recording action will take place may be determined by the two-position switch 75 selectively interconnecting the output line 63 of the gate 61 to line 63(*a*) or line 63(*b*).

The basic manner of providing an inventory system, using the just described storage techniques, will now be explained. For purposes of providing a relatively simple example, each of the remote stations 10, illustrated in Figure 1, may consist of three registers, these being (1) the identification register 59 mentioned above, (2) an existing inventory register 76, and (3) an inventory alteration register 77. The item identification register 59 may in its most simple form comprise a plurality of single pole, single throw, manually operated switches. The arm 78 of each switch may be connected over a line 80 to a station of the coincidence circuit 58. The contact of each switch may be connected to a source of suitable potential to operate a relay in the coincidence circuit 58. Thus, an operator (for present purposes assumed to be versed in binary coding, although suitable decimal-to-binary switches are well known and may be used) may set up a binary number on register 59 which will serve through the coincidence circuit 58 to provide a gated timing pulse at the switch 75 representing a predetermined locator row on the drum 20. That is, the passing of a row, such as row 49, 50, or 51, adjacent the transducers 52–54, will be represented by the pulse. A pulse will occur on every drum revolution. Now, by manipulation of a suitable control (not shown) at the remote station, the operator may move the switch 75 either to connect with the line 63(*a*) or the line 63(*b*). If the operator is interested in determining the existing number of items in the inventory, the switch 75 may be operated to connect with lines 63(*b*) and the resulting signals transmitted over the lines 72–74 from the gates 69–71 will be available at the existing inventory register 76.

The register 76 may be comprised of lamps 82 which will be lighted and remain lighted upon the occurrence of voltage pulses on lines 72–74 resulting from a voltage available at reading amplifiers 66–68 at the moment when a gated transfer pulse (as delayed by delay circuit 64) opened the gates 69–71. A pulse on a line 72–74 may indicate a 1, and no pulse a 0. Circuits feeding lamps 82 may be supplied through a suitable relay circuit, such as a thyratron circuit, so that once the lamps are lighted they will remain lighted until cleared.

Having located the item by means of item identification register 59, and being appraised of the quantity thereof by means of register 76, the operator may now, if he so desires, alter the just read information at the inventory alteration register 77. The register 77 may be similar to the item identification register 59. That is, it may comprise a plurality of single pole, single throw switches which will serve to supply potentials over leads 84 which connect to the triggering means of writing circuits 38–40.

Figures 3, 4:
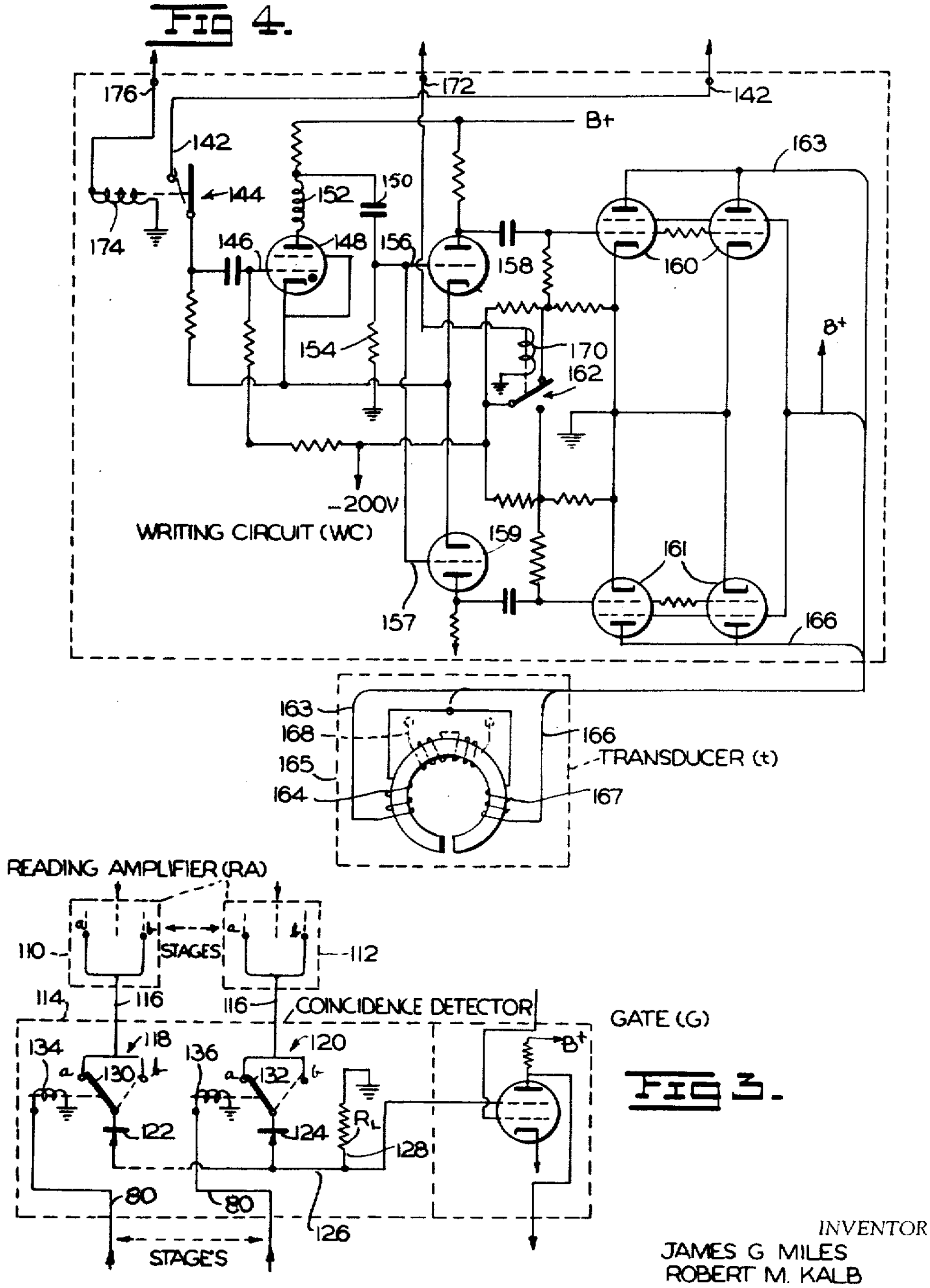
Figure 3 shows a circuit diagram of coincidence detector circuits employed in the invention.
Figure 4 shows a circuit diagram of writing circuits employed in the invention.

A more detailed description of the incorporation of suitable circuits from the above mentioned patent applications and particularly from the application of Hendrickson et al., Serial No. 203,612, now Patent No. 2,771,595, into the present system, as diagrammed in Figure 2, will now be given. Referring now to Figure 3, reading amplifiers are diagrammatically illustrated within blocks 110 and 112. These blocks indicate the output end of reading amplifiers, such as those described in the above mentioned patent application to Hendrickson et al., and are amplifiers of a type which may be used in Figure 2 as circuits 55–57 and 66–68. As discussed in the above mentioned patent application, the reading amplifiers 110 and 112 may be arranged to receive input signals from associated transducers and produce complementary output voltages at two terminals indicated as *a* and *b* within each reading amplifier circuit in Figure 3. As is explained in detail in the above mentioned Hendrickson et al. application, when an associated transducer is reading a 1, a relatively negative potential, such as −30 volts may appear at the *a* terminal of the reading amplifier and a more positive voltage, such as 0 volts, may appear at the *b* terminal. On the other hand, when the associated transducer is reading a 0, the voltages are transposed with the more positive voltage appearing at the *a* terminal and the negative voltage appearing at the *b* terminal.

Each terminal of the reading amplifiers is connected over suitable conductors to the coincidence circuit, which is designated 114 in Figure 3, the circuits within block 114 corresponding to those contained within block 58 of Figure 2. The connection between blocks 110, 112, and block 114 are illustrated as within trunk conduits 116, each of which will contain two separate conductors leading from terminals *a* and *b* of each reading amplifier to correspondingly designated terminals *a* and *b* of detecting stages 118 and 120 within the coincidence detector block 114. It will be understood that there may be *n* stages between stages 118 and 120, only two stages being illustrated for convenience.

In this specification, in diagramming circuit details within blocks which are illustrated elsewhere, input and output lines are arranged to extend from the blocks in corresponding physical location. That is, for example, the block diagrams in Figure 2 correspond as to interconnecting lines with the external circuitry of blocks 110, 112 and 114 of Figure 3. Also in this specification, wherever a plurality of conductors may be contained within a trunk conduit, such as conduit 116, and where the detail of the conductors entering and leaving the conduit is shown, the individual conductors curve into the conduit indicating that the conductors are not electrically interconnected. On the other hand, wherever conductors are electrically joined, the connection is at right angles and is indicated by a dot over the joint.

Within block 114 a coincidence circuit is provided which comprises unidirectional conducting devices, such as crystal diodes 122 and 124, having one side thereof connected in common to a bus conductor 126 which is attached to the ungrounded end 128 of a common load resistor $R_L$. Since the other end of $R_L$ is grounded, conduction will occur through diodes 122 and 124 only if relay arms 130 and 132, which are respectively connected to the other sides of the diodes, are connected to relatively negative potentials. Accordingly, those skilled in the art will understand that, if each of the diodes 122 and 124 is not conducting, there will be no voltage drop across $R_L$. However, if any one or more of the diodes 122, 124 should be conducting, there will be a voltage drop across $R_L$. The number of diodes may be multiplied if desired and yet there will be two clearly defined potential states at end 128 of resistor $R_L$: one when no diode conducts, and the other when one or more diodes conduct. It will be further apparent that coincidence can be established for any combination of 1's and 0's being read at the associated transducers if the switch arms 130 and 132 are set to anticipate the above mentioned 0 voltage rather than a negative voltage in each stage. The arms 130 and 132 may be set by operation of switch arms 78 at the item identification register 59 (Figure 2) by attaching the leads 80 from register 59 to relay coils 134 and 136 (Figure 3). These relay coils are arranged to operate the relay 130 and 132, respectively. Arms 130 and 132 may be normally biased as by a suitable spring to be in contact with the *b* terminals when the coils are not energized and to be moved to the *a* terminals upon energization of the coils.

When reading amplifiers are used, as at 66–68 in Figure 2, only one of the terminals *a*, *b* need be connected to operate the gates 69–71. That is, it is only required in this use to obtain a given operating potential for one and not for both of the 1's and 0's being read by the transducers.

The adaptation of suitable writing circuits from the above mentioned Hendrickson application will now be desscribed. Referring first to Figure 2, it will be noted that in the case of each of the writing circuits 38–40, three lines lead from the top of the blocks and one line from the bottom. The left-hand upper line from each block is interconnected over a line 138 to a manually operated switch 140 at the inventory alteration register 77. Line 138 may be termed a "suppression" line and signals supplied over this line through switch 140 permit the writing circuit to operate only while switch 140 is closed. The central upper line from each writing circuit is connected over previously mentioned line 84 with one of the stages alteration register 77 and signals applied over lines 84 serve to determine the binary nature of the flux which the writing circuit will induce into the drum 20. The upper right-hand line from each writing circuit is interconected to the previously mentioned line 63*a* over which are supplied coincidence gated timing pulses. The bottom line will carry the writing signals to the transducers.

Referring now to Figure 4, which is an example, not by way of limitation of a writing circuit which may be used, a gated timing pulse, applied to the upper right-hand line here designated as 142, is applied through relay 144 to act as a trigger pulse at the control grid 146 of a gas-filled discharge tube 148. Upon being triggered, conduction in tube 148 causes a condenser 150 to discharge through an inductance 152 and resistor 154 thereby creating a voltage across resistor 154 which is of a wave shape which is substantially a single half sine wave. This voltage is simultaneously applied to control grids 156 and 157 of voltage amplifying tubes 158 and 159, respectively. The anode of each of the tubes 158 and 159 is coupled to the control grids of pairs of parallel connected current amplifying tubes 160 and 161. The bias of tubes 160 and 161 is selectively determined by a relay 162 movable between two positions, so that only either tubes 160 or tubes 161 will amplify. The arm of relay 162 may be connected to a source of −200 volts, as indicated in Figure 4. When the switch 162 is in its lower or 0 position, then only tubes 160 will be properly biased for conduction when an output pulse appears at the anodes of tubes 158 and 159. Accordingly, current will flow only through a line 163 and will energize only the winding 164 of the transducing head within the dash line designated 165. However, if the relay 162 is moved to its upper or 1 position, the above situation will be reversed and only the tubes 161 will permit current to flow through line 166 to the winding 167 of the transducer. (It will be understood that the winding 168, shown within the block 165, is employed for reading purposes only.)

Whether a 1 or 0 will be written by the transducer will be determined by the position of relay 162, as above mentioned. Relay 162 may normally be in its lower position and may be moved to its upper position by energization of an associated coil 170 which will be energized over a line 172, which line may be interconnected with lines 84 from the alteration register 77 in Figure 2. Relay 162 may be a suitable high-speed electronic circuit if desired.

The previously mentioned relay arm 144 may be normally in open circuit position, but may be moved into contact with the line 142 upon energization of relay coil 174. Coil 174 may be connected with line 176 which may, in turn, be connected as to the previously mentioned line 138 of Figure 2, so that, unless line 138 is energized as by switch 140, the writing circuit will be suppressed because none of the gated timing pulses on line 142 will be permitted to trigger the grid 146 of tube 148. While switches 140 and lines 138 may be duplicated, if desired, overwriting of the same binary bit in a cell will not affect the stored data. Relay 144 may be a suitable high-speed electronic circuit if desired.

Figure 4 is an example of a writing circuit which may be used, and is not a limitation on the writing circuit means which may be used. Other circuits, some more simple, have been devised for accomplishing the writing function.

Although the central switching equipment 12 (Figure 1) forms no part of the present invention, and is therefore not described herein, it will be understood that a suitable control located at each remote station 10 will serve to maintain connection between a given station 10 to the exclusion of the other remote stations until the operator at the connected station completes his transaction.

From the description contained in the preceding paragraphs and with reference to the above mentioned co-pending patent applications, it will be apparent that by the present invention, there is provided a basic inventory system which will operate with great speed and accuracy to report and record a vast number of items. It will be further appreciated that the inventory may be controlled from a plurality of remote stations and with practically no interference among the stations because of the short period of time required to enter the storage unit to determine the number of items on hand and to alter these items accordingly to indicate the disposition or acquisition of the items. The longest time required to perform a transaction step will be not more than one drum revolution, which may be as little as 1/3000 minute or less.

To further illustrate the present invention, and to demonstrate how the basic inventory system as above described may be employed in a more complex system having automatic computing characteristics, the invention, as embodied in an airlines reservation system, will now be described.

In normal operation of airlines equipment, it is necessary that space for a particular flight be reserved so that the airline patron can be assured of flight passage for all phases of his travel. In present systems, this reservation request is handled by telephone, telegraph, or teletype inquiry and response, whereby personnel in the office of the airline check a reservation or a group of reservations by inquiring for space availability, waiting list accommodations, and so forth. To do so, requires that each portion of a flight, which is ordinarily called a flight "leg," must be checked if the patron desires passage on only part of a "flight" (where "flight" is hereinafter used to designate the entire scheduled journey taken by the airplane, rather than any part of it). To keep an accurate and satisfactory check of flight availability, it is ordinarily required that the airline will maintain central records which indicate by date and flight number the availability of seats on each portion or leg of that flight. If the entire flight or a portion thereof is sold out, waiting lists are maintained for each flight leg to permit registration of patrons for future acceptance on the flight if cancellations occur. For an airline with several flights for each calendar day, the problem of maintaining accurate up-to-the-minute flight information becomes difficult, and to properly carry out the accurate assignment of flight space requires the time and effort of many people within the airline offices.

Two commonly used methods of space assignment for airlines are those known as "sell and record" and "request and confirm." In the "sell and record" method, space is sold by the reservations clerk (and he, in turn, records each sale with the central records office) until a signal is received by him to discontinue sales. This signal is usually sent to all clerks and simultaneously, when the central records office becomes aware that almost all of the space for a given flight is sold. A few seats are kept for sale following confirmation to prevent overselling a flight. The "sell and record" method permits rapid handling of reservation requests because the clerk makes the sale immediately upon request on the assumption that space is available, unless he has been notified to the contrary.

In the "request and confirm" method, the reservations clerk first checks space availability and then makes a sale. This requires that he check with the central records office (or with some intermediate office holding a block of reservations) before confirming a space sale. The "request and confirm" method prevents overselling, but is time consuming because of the requirement for checking each sale. In practice, many airlines use in combination both the "sell and record" and the "request and confirm" systems, the latter being used after the central office signal is given to reservations clerks to discontinue sales on the "sell and record" system. Unfortunately, this means that the slower of the two methods is being used at a time when speed is ordinarily very important.

To reduce the errors which ordinarily result from the present types of reservations methods, and to minimize the time required to check and authorize each reservation, the present invention provides an airlines reservations system which is a completely automatic central intelligence system for storing information of seat availability by date, flight, and flight legs, which supplies this information at the inquiry of any remotely located ticket office, and which automatically changes the stored information to conform to ticket transactions completed at that office. Supplementary information, such as the existence of a waiting list or special situations on portions of a flight, can likewise be made a part of the record.

All stored information is current, and all transactions are instantaneous. The method is fully automatic and allows reservations personnel to interrogate and obtain information from the system without assistance. Access to the records is through special keyboards located as needed in the ticket and telephone reservation offices. The reservations clerk manually registers the wanted transaction on the keyboard, with proper reference to the date and journey desired. Answers to the request are indicated by the lighting of appropriate lamps associated with the keyboard (as will be explained below) or by any other suitable indicating means.

Figure 5:
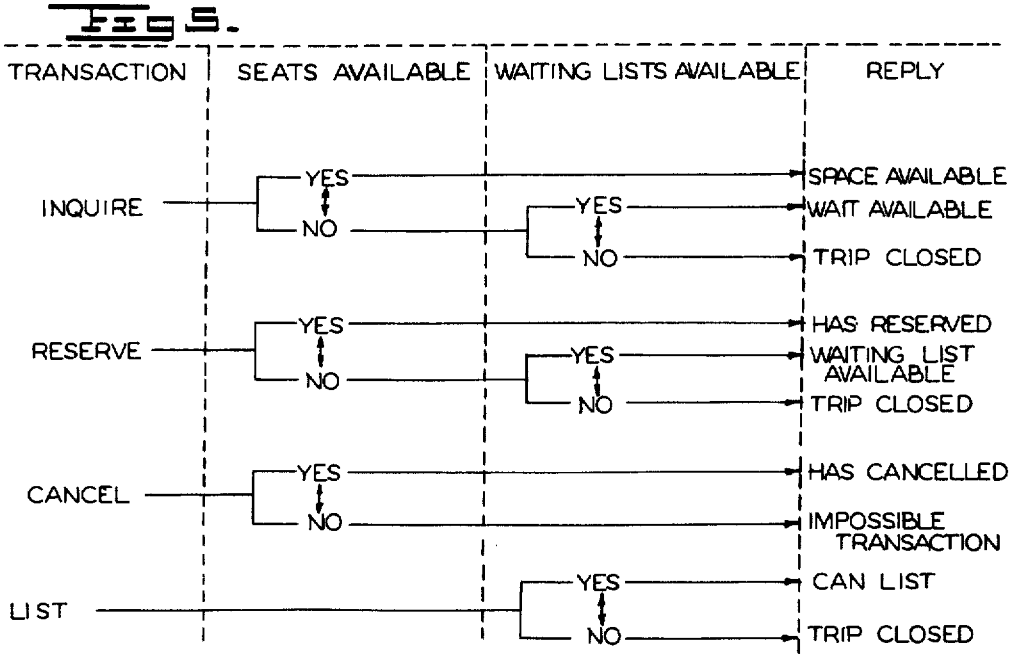
Figure 5 shows a chart of transactions which may be carried out by use of the invention.

The typical kinds of sales transactions and the possible answers returned under various situations are charted in Figure 5. A reservation clerk, acting for his patron, may want to "multi-inquire" about space availability on a group of trips, "reserve" one or more seats on a flight or flight leg, "cancel" reservations which the patron will be unable to use, or to "list" the patron for a reservation if space becomes available (equivalent to the usual "waiting list"). In normal operation, the waiting list is limited in length; therefore, it is necessary for the reservation equipment to indicate whether waiting list space is available or whether the flight has been closed to both reservation and waiting list requests. Figure 5 illustrates the possible types of transactions which the equipment can provide.

To accomplish with speed the transactions listed in Figure 5, it is important that the total time required for any of the transactions be short. Normally, only one remote station at a time will gain access to the records; however, the short "holding time" (that time consumed in the main equipment components in any one transaction) allows for the rapid handling of a large number of transactions. As previously mentioned, switching apparatus, similar in principle to that of an automatic telephone exchange, may be employed to connect the remote station to the storage or inventory system in its proper turn and disconnects it as soon as the reply has been transmitted.

The central intelligence records pertaining to reservations, etc., are kept, changed, and handled by means of magnetic storage equipment of the type described above. Stored in this equipment, which serves as a repository for a number of separate items of information, are numerical or alphabetical quantities or other information stored in numerical or alphabetical form, and this information is available for processing. The exact nature of the storage is arbitrary, but in typical operation, the storage equipment for an airlines reservations system might contain records of information of all flights and flight legs, including information of the number of seats available on each leg. As a typical example, the central intelligence records may have capacity to store the data of 36 days with 400 flights each day. The total number of seats in each flight may differ, but in present practice, it is usually adequate to store information for less than 80 passenger seats. For a typical airline, the number of legs in the several flights may be different, and the amount of stored information for long and short flights (as specified by the number of flight legs and not by the total mileage of any flight will vary according to length of flight). The assignment of areas of storage space can be arranged at will with some corresponding change in the total number of flights that can be accommodated. To satisfy typical requirements concerning the number of legs in various flights, 300 of the 400 flights per day may have 3 legs or fewer, and of the other 100 flights per day listed, 92 might have as many as 9 legs, and 8 might have up to 18 legs. The above storage capacity divided as to flight length as exemplified is adequate to handle the entire inventory problem for a typical United States airline for a period of 36 days (the provision for 36 days is arbitrarily chosen to allow all information of one month of flight records and up to 6 additional "special" days, for which reservations might be recorded more than one month in advance).

The arrangement of an inventory system, as represented by an airline reservation system, and including computing functions according to an embodiment of our invention, will now be described in detail with reference to Figure 6. (Figure 6 consists of Figures 6A and 6B which join between the top of Figure 6B and the bottom of Figure 6A to form Figure 6.) The system includes a first or catalog drum 210 and a second or main storage drum 212. As will be more fully explained below, the catalog drum 210 is entered first to pick out certain information relating to specific items of information in the main storage drum 212. Each of the just mentioned drums 210 and 212 is provided with a timing track for generating suitable timing pulses. These timing pulses are produced by timing pulse generator (TPG) 214 associated with drum 210 and timing pulse generator 216 associated with the drum 212. Timing pulses from generator 214 are applied to a catalog coincidence detector and gate circuit 218 and the timing pulses from generator 216 are applied to a storage coincidence detector and gate circuit 220. Circuits 218 and 220 each may be the combination of detector 58 and gate 61 of Figure 2. Circuits 218 and 220, in other words, comprises the total circuit shown in Figure 3.

As a typical example, the storage drum 212 may be approximately 31 inches in diameter and 19 inches long and may be rotated at approximately 400 r.p.m. A drum of this size, in accordance with the previously mentioned patent applications, may contain approximately 2 million magnetizable areas in which information can be stored. The catalog drum 210 holds information relating to the number of the flight and to the portions of the flight to be used in connection with each trip The catalog drum may be of smaller physical dimensions than the storage drum, because of a lesser requirement for stored information. The catalog drum may rotate at a higher speed than the storage drum; for example, it may be approximately 4¼ inches in diameter, 14 inches long, and may be rotated at 6 thousand r.p.m. A drum of this approximate size may contain 2 hundred thousand magnetizable areas or cells for holding the information.

There are several advantages in employing the above described two drum or divided entry storage system. It is preferable to enter into the main storage drum 212 with a minimum of information to inquire into the inventory tabulation. The system of the present invention makes it possible to so enter the main storage with a minimum of information by having the catalog drum serve the intermediate function of sorting the input information and selecting only the pertinent sections of the main storage which are applicable to the transaction being carried out. In this respect, the catalog drum serves as an index to partially confine the inquiry to only the proper flight legs requested by the inquiry.

Two drums, operating at different speeds as mentioned above, are preferable because, as will become more apparent below, the total number of drum revolutions consumed in carrying out a given transaction is considerably reduced. However, from the following it will be apparent that a single drum may be employed with the catalog information on one portion of the drum surface and the main storage information on another portion of the drum surface. It will be further apparent that basically, only one type of storage is required to carry out the function of the invention. However, with the latter type of operation, it will normally be difficult to avoid consuming a complete drum revolution to carry out a complete transaction. On the other hand, by employing the two drum divided entry system, it may be actually possible to search through an entire group of trips within a fraction of a complete revolution of the main storage drum 212.

The layout of information on the catalog drum 210 may be most readily understood by reference to Figure 7. Figure 7 shows a chart of columns identified by legend as to "group number," "trip number," "sequence number," "flight number," and "flight legs involved." Each column is analogous to one or more actual tracks on the surface of the catalog drum 210. Similarly, each horizontal row of numbers is analogous to one row of electrically aligned cells on the drum surface. An "index number" column is also provided for containing reference numbers which may be utilized to locate specific rows of the drum for such purposes as altering information contained in the same row in the other columns. The flight leg columns numbered 1, 2, 3, etc., each may consist of only a single track in which a single transducer operates.

As will become more apparent below, a trip may refer to a particular route between two geographical points and a group may consist of a number of trips all serving the same two geographical points. The flight number will refer to the actual scheduled flights which go to make up trips. However, the term flight and trip will be distinguished by the fact that a flight may originate before and extend beyond the two geographical points which are involved as a trip. However, a flight, as modified by the legs of the flight involved, becomes identical with a particular trip.

The layout of numbers on the main storage drum 212 may be understood with reference to Figure 8. In this figure, as in Figure 7, the columns are analogous to groups of tracks on the drum surface and the horizontal rows of numbers are analogous to rows of electrically aligned cells on the drum surface. The columns in Figure 8, as indicated by legend, pertain to an "index number," "plane capacity," "flight number" (which are identifiable with the flight numbers on the catalog drum) "date" and "seats available" in each of the flight legs corresponding to the flight legs on the catalog drum. As an example, if the drum is so oriented that the transducers in the various tracks at a given instant of time lie over the row of numbers third from the top in Figure 8, the information read off will be that of date 31 (index 2103) flight number 90 will be made by a plane having a seating capacity of 60 and, at the instant of time involved, 40 seats are still available on leg 1, 56 seats are still available on leg 2, and so forth.

As will become apparent below, the main storage drum 212 may carry additional tracks devoted to information regarding waiting lists and the like.

The components of the system employing drums 210 and 212 will now be described in detail in connection with a description of the operation of the equipment.

The remote control stations will be some what more complex than in the basic system of Figure 2. Referring to Figure 6 (6B), a remote control station here designated 10' will comprise a date register 221, group register 222, trip register 223, multi-inquire reply register 472, transaction command register 224, and a transaction command reply register 530. As will become more fully apparent below, the date, group, trip and transaction command registers may be keyboard controlled switching circuits in which enabling potentials may be applied to various conductors within lines leading from the registers. The reply registers, on the other hand, will comprise, for example, arrays of signal lights and will provide reply information to the remote station operator.

It will now be assumed that a patron in a remote station 10′ wishes to be advised if he may obtain a reservation for four persons between cities A and B on a certain date. Four is given here as a specific example; there may be *n* persons. To the operator, this means that a group of trips is involved, and the reservation apparatus should be commanded to search through all the trips of the pertinent group and reply as to which trips are still open for the requested number of seats. This is termed herein a multi-inquire transaction.

The operator will first set the given date in the date register 221 and the pertinent group number in group register 222. The latter register connects over line 222′ with the stage of coincidence circuit 218 corresponding to the "group" tracks of drum 210. The trip register 223, which connects with circuit 218 over line 223′, will be left at zero for reasons which will become apparent below. Next the operator will turn to the transaction command register 224.

The transaction command register 224 will have a plurality of conductors connected therewith, these conductors being within line 224′. The conductors are conveniently illustrated in Figure 9E by suitable legend, the lines being the following: "transaction complete," "start transaction," "No. of seats involved," "cancel," "reserve," "establish waiting list," "multi-inquire" and "initiate writing." These lines will contain a single conductor, except the "No. of seats involved" line, which will consist of a plurality of conductors in the given example.

Figure 9A:
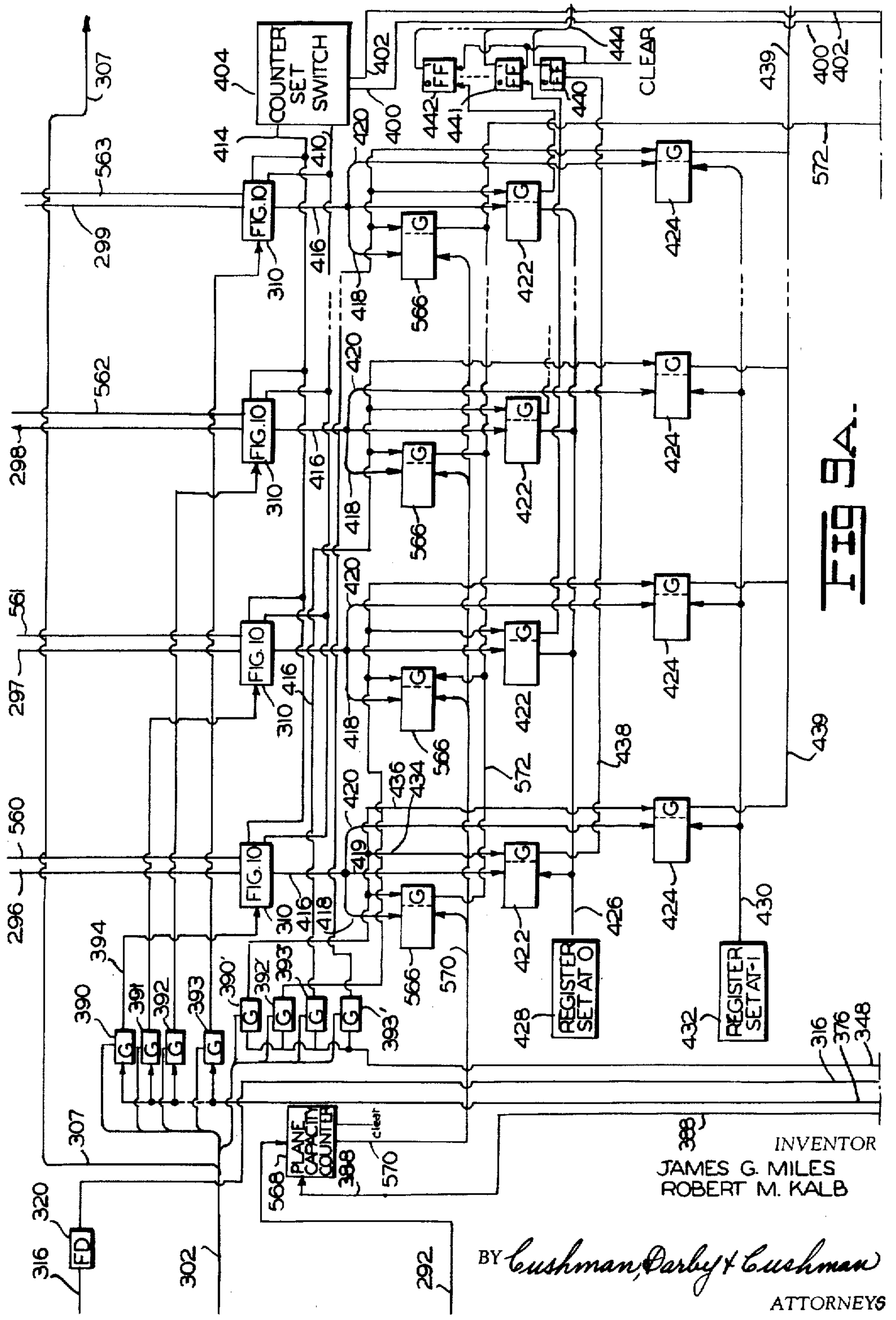
Figure 9B:
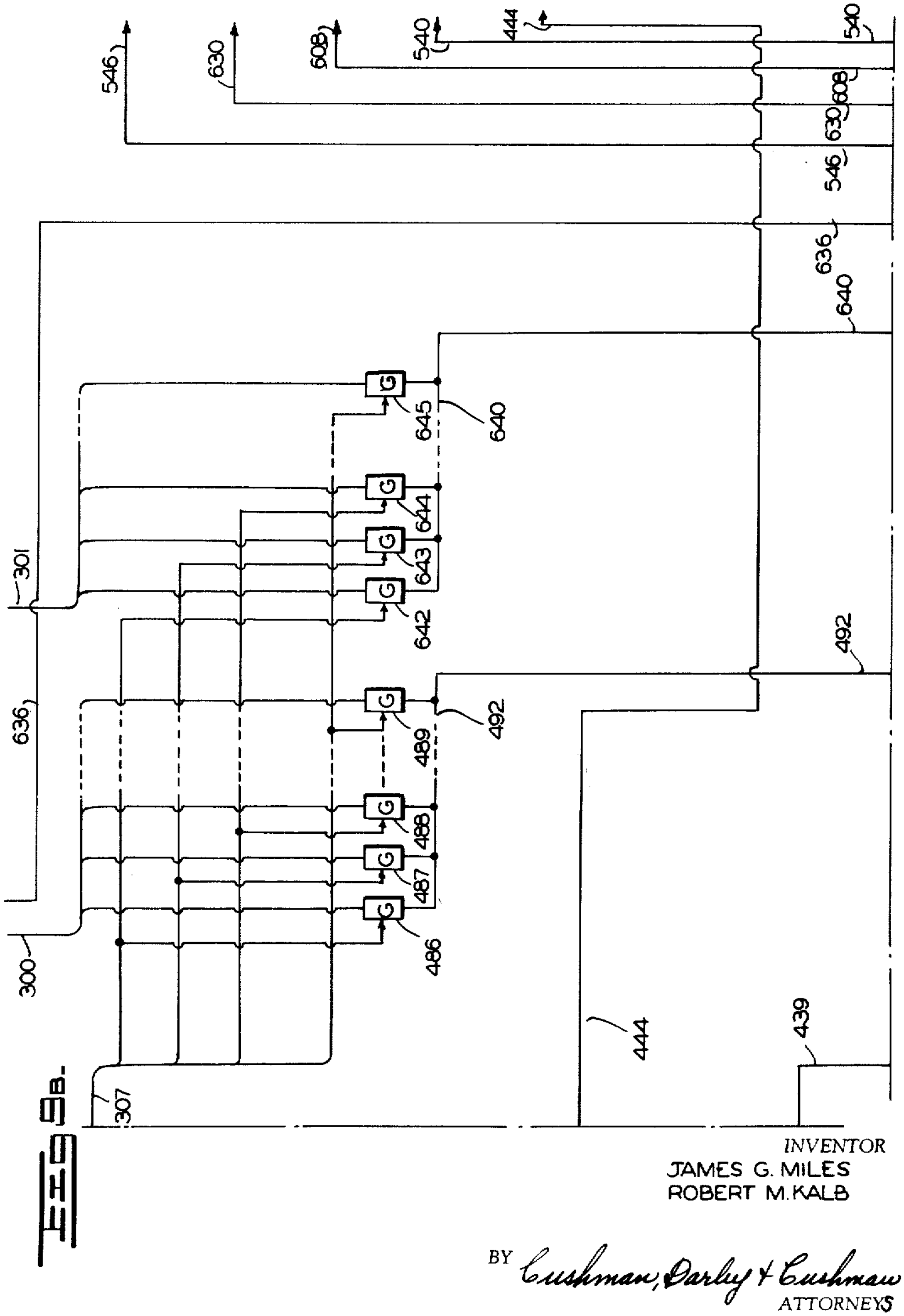
Figure 9C:
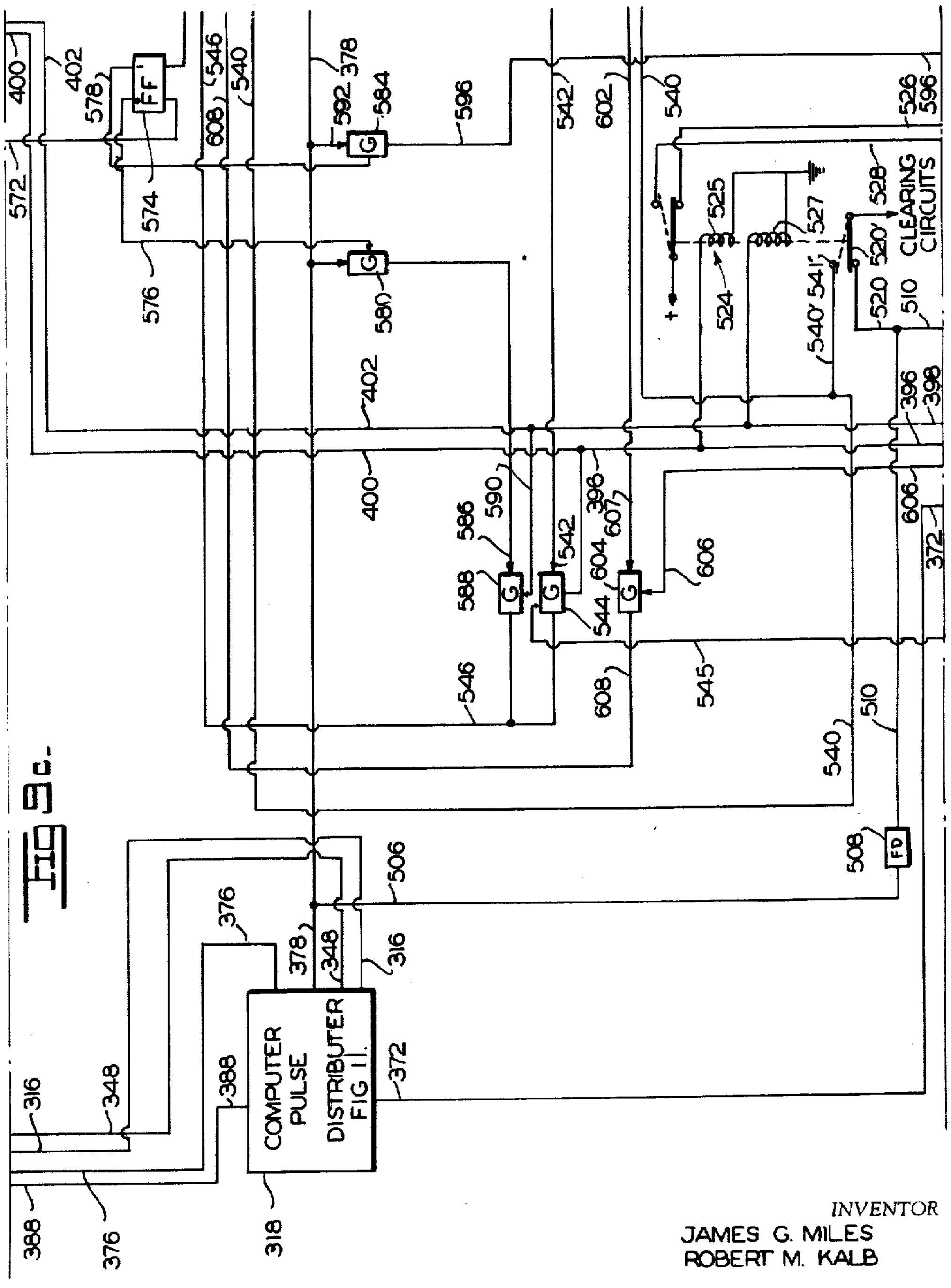
Figure 9B:
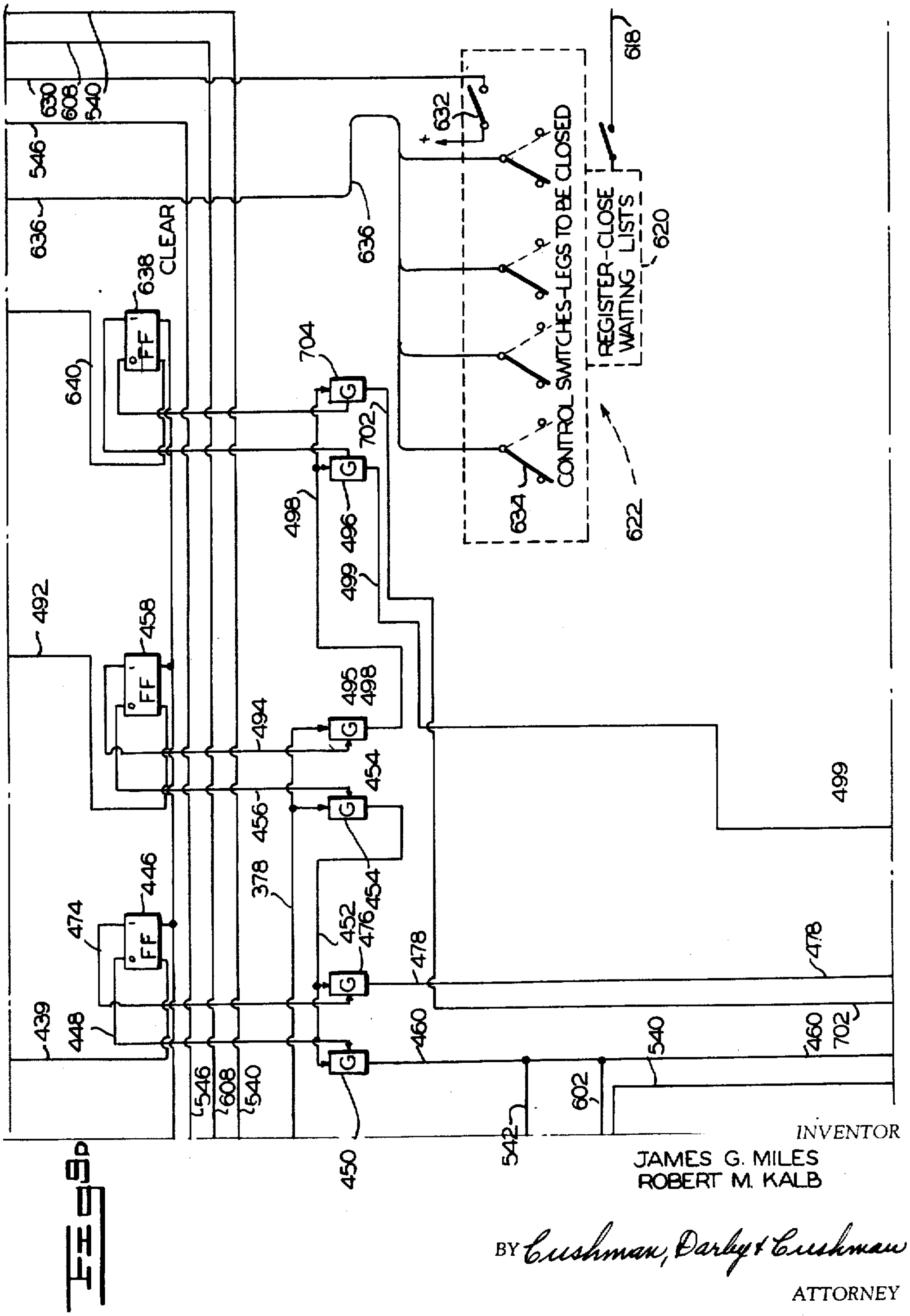
Figure 9E:
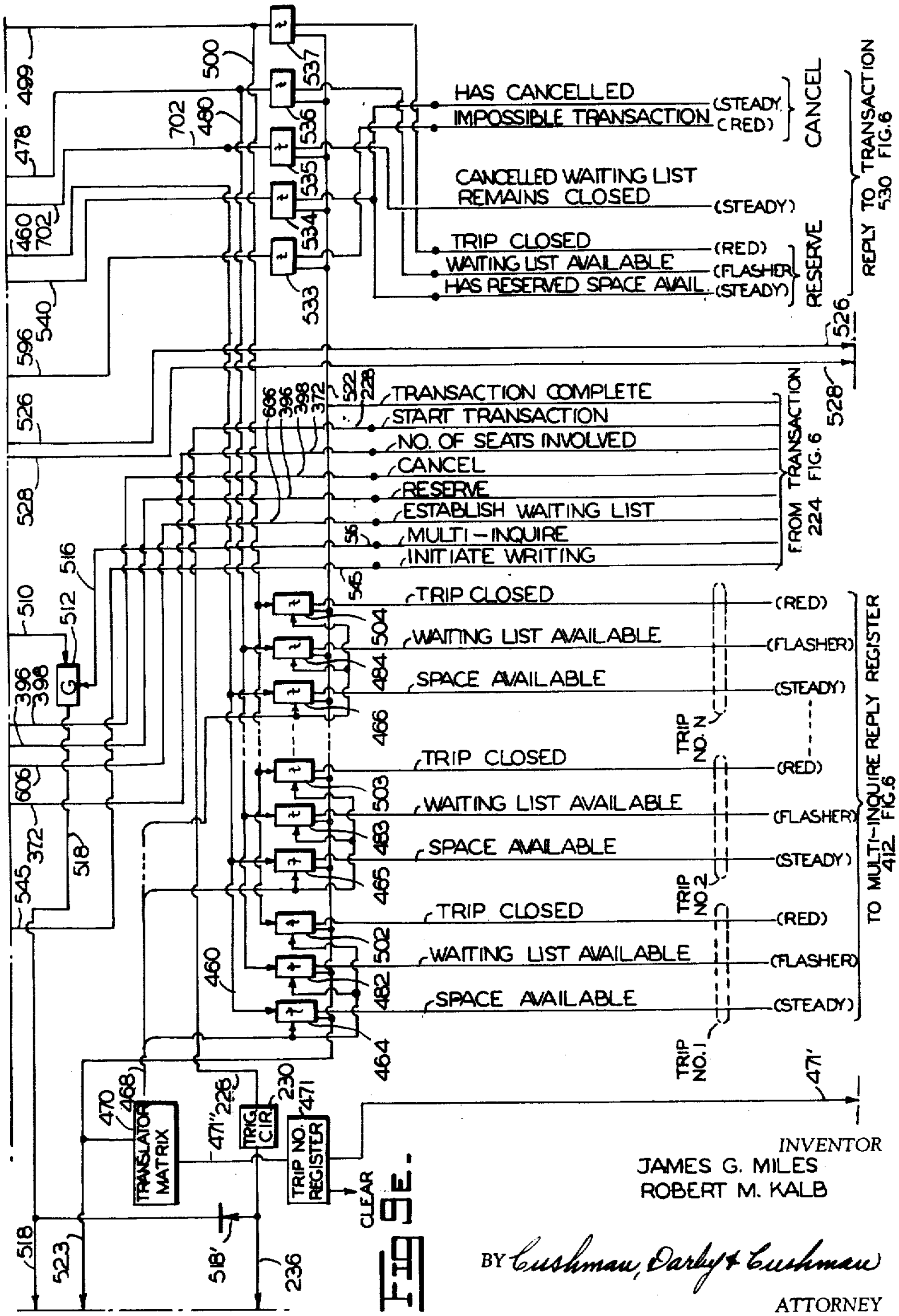

It may be noted at this point that Figure 9E is one of five figures, 9A–9E, which make up Figure 9, this figure illustrating what may be termed the "computer" section of the system. The computer section is designated as 225 in Figure 6. Figure 9 is organized from Figures 9A–9E in the manner indicated by the dash lines and legends within the block outline of computer 225 in Figure 6.

Figures 9A–9E are collectively referred to hereinafter as Figure 9.

At register 224, as soon as the operator has closed switches energizing the multi-inquire and the No. "4" of the "No. of seats involved" lines, the "start transaction" line is then energized. It is understood that the drums are rotating and the system previously cleared. The energization potential of the start transaction line is applied over line 228 (Figure 9) to a suitable triggering pulse generating circuit 230. Operation of circuit 230 produces a single transaction start pulse on line 236 and this pulse is applied to trigger a single coincidence gated timing pulse (SCGTP) generator 240 (Figure 6).

The generator 240 upon being triggered by a pulse on line 236 will permit only a single one of the coincidence gated timing pulses from circuit 218 to be passed to a line 244. In other words, as drum 210 continuously revolves, on every revolution a coincidence gated timing pulse will be produced in circuit 218 each time the particular row being located passes beneath the reading transducers associated with drum 210. However, circuit 240 will permit only one of these pulses to appear on line 244. A suitable circuit for generator 240 may be had with reference to Figure 14 of the above mentioned application, Serial No. 175,832, now Patent No. 2,614,169, to Cohen, et al. Reference to the just mentioned application will show that following the previously mentioned triggering pulse on line 236, the generator 240 will produce only one output pulse on line 244, with the further refinement that only a full-sized pulse will be available.

The single coincidence gated timing pulse on line 244 will momentarily open gates 246 and 248, connected respectively over line 249 with the line 244, and also connected with the reading amplifier circuits 250 and 251 of the legs involved and flight number tracks of catalog drum 210.

Following the energization of the "start transaction" line at register 224, the information on a particular line of the drum 210 will be gated through just mentioned flight number and legs involving gates 248 and 246, respectively, at the first occurrence of a single coincidence gated timing pulse on line 244 which locates the predetermined row on the drum. The row on catalog drum 210 which has been located will be the row containing information according to the group number set in group register 222 and a sequence number 0. In a multi-inquire transaction, group numbers in combination with sequence numbers, as determined by a sequence counter 252 and applied to coincidence circuit 218 over line 252′, will serve to identify a particular trip and the trip register 223 will not be employed. The trip register 223 is made ineffective in the coincidence detector 218 by setting the register 223 to zero and by disabling the trip number reading circuits by use of a group of gates 254′. This leaves coincidence to be determined between group number and the sequence number. Gates 254′ may be disabled in a manner to be described below.

The proper flight number and indication of the legs involved in the particular flight to make up the given trip are stored in flight number register 256 and legs involved register 258, respectively. These registers may be made up of flip-flop or thyratron stages.

The flight number, as contained in register 256, and the date, as preset in the date register 221, are next employed to locate a specific line of main storage drum 212. This is accomplished as follows:

The single coincidence gated timing pulse appearing on line 244, which opens gates 246 and 248, is also applied over a line 262 to trigger a single coincidence gated timing pulse generating circuit 264. Line 262 may proceed through a fixed delay circuit 266, this delay circuit being employed if desired to introduce a sufficient delay in the pulse transfer to insure that registers 256 and 258 have had time to receive the signals passing through gates 246 and 248. Following the triggering of circuit 264 over line 262, the next occurrence of a coincidence gated timing pulse on a line 268 proceeding from detector 220 will permit a single pulse on a line 270 indicating that the row of cells on drum 212 has been located which contains information relating to the flight number present in register 256 and the date present in register 221. Date and flight number information is applied to detector 220 over lines 271 and 272, respectively. The single timing pulse on line 270 will then be applied to gate groups 274, 276, 278, 280, 282, 284, and 286. The just mentioned gate groups are employed to pass from drum 212 information of the following classes: Plane capacity information, 274; seat data, 276, 278, 280 and 282; waiting list closed, 284, and waiting list exists, 286. Upon the occurrence of the single coincidence gated timing pulse on line 270, each of the gates of the just mentioned groups of gates will be opened to permit information from associated tracks on drum 212 to be available for computation purposes.

The signals passing through plane capacity gates 274 are applied over a line 288 to a plane capacity register 290. This may be a thyratron-type register and may be similar to the other registers, such as registers 256 and 258. The output signals of the plane capacity register 290 are applied over a line 292 to the computer circuit 225. The signals which pass through gate groups 276, 278, 280, 282, 284, and 286, are introduced into computer 225 over lines 296–301, respectively.

It will be recalled from the foregoing that a given trip under consideration will usually involve only certain legs of a scheduled flight. Therefore, in ascertaining whether a given transaction may be performed over a predetermined trip, only certain flight legs need be investigated. Control of flight legs involved is accomplished by use of register 258. Gates at 246 will have placed in each stage of register 258 either a signal or no signal, depending upon the legs involved in a trip. The signals in 258 will be applied over a line 302 to computer 225 and there employed in a manner to be described below to permit computation on only the legs involved.

From the apparatus as thus far described, it will be apparent that following an entry into drum 210, the information gathered from drum 210 has been applied to drum 212 and information has been extracted from drum 212 and is available for computation in computer 225.

The computation procedure may now be understood with reference primarily to Figure 9.

It will be recalled that the example presently being traced is an inquiry as to whether four seats may be reserved, four seats being merely an example of "*n*" seats. For purposes of simplification, it will be assumed that for sequence number 0 only one flight leg is involved. This leg may be that from which seat data proceeds through the gate groups 276 with the seat information being available at the computer 225 over line 296. Each of the lines 297–299 also carries seat data information into the computer and one or more of these lines may come into use if other flight legs are involved. The inquiry (which will involve some aspects of computation) to be made is whether the number of seats available may be decreased by four and yet the total number of seats available will not go below 0. This is carried out in the following manner: Referring to Figure 9 (9A), the seat data information on line 296 is applied to a seat data arithmetic counter 310. The circuit details of the counter 310 may be understood with reference to Figure 10.

The arithmetic counter, as illustrated in Figure 10, comprises interconnected electronic tube counting stages of conventional variety, the stages comprising a group of flip-flop stages designated generally as 312. Each of stages 312 is essentially a flip-flop of a type which is more fully described in the following paragraph.

Each stage of group 312 is adapted to be cleared to 0 over a clearing line 314 and this clearing will be accomplished before a transaction is attempted. Having been cleared to 0, the stages will then either remain at 0 or be set to 1, depending on which of the tracks of drum 212, as connected over line 296, produces a binary 1 upon the occurrence of the previously mentioned single coincidence gated timing pulse on line 270 (Figure 6A). Accordingly, it will be apparent that the stages 312 of the counter 310 will act as a register to retain the data as to seats previously available in the particular flight legs involved. This may also be considered as presetting the counter. Along with the registry of the seat available data in stages 312, the single coincidence gated timing pulse available on line 270 is applied over line 316 to start a computer pulse distributor 318, shown in Figure 9C. The starting signal over line 316 may proceed through a suitable delay circuit 320 to insure that the seat data is established in counter stages 312 before the pulse distributor 318 is started.

The computer pulse distributor 318 may be understood with reference to Figure 11. In this figure, the start pulse appearing on line 316 is applied to the set terminal of a flip-flop 322, which will set flip-flop 322 to its 1 position. FF is used to indicate, by way of example, a typical registration circuit as used in digital computers. It may comprise a balanced type Eccles-Jordan circuit, or it may comprise, in suitable cases, any circuit with latch-in characteristics, as for example, a thyratron, a magnetic amplifier type flip-flop, a transistor, or a "coherer." Circuit details for suitable flip-flops will be apparent to those skilled in the art and, furthermore, may be understood with reference to the above mentioned patent applications. In the present application, flip-flop 322 and all other flip-flops hereinabove referred to are diagrammatically illustrated by a block having input lines entering the block adjacent the lower left- and right-hand corners and having output lines extending from the block adjacent the upper left- and right-hand corners. The upper left-hand output line is designated by a 0 and the upper right-hand line a 1. It will be understood that the circuit arrangement is such that a pulse appearing on the left-hand input line will cause the right-hand or 1 output line to move to its relatively high potential. A subsequent pulse appearing on the right-hand input line will correspondingly move the 0 output line to its high potential and the 1 output line will return to a lower potential. As an example, referring to flip-flop 322, if the flip-flop is originally "cleared" to its 0 position, the pulse on line 316 will set the flip-flop to its 1 position.

The resulting enable signal from the 1 terminal will be applied over line 324 to a gate 326. Gates are conventional circuits well understood by those skilled in the art in which two or more tube control grids are connected so that a signal may be transmitted through the gate only if an enable signal is simultaneously present on all of the grids involved. Gates may be of a two or three input variety. For example, gate 326 is a two input gate having one grid enabled over line 324 and the other over line 330, so that pulses arriving over line 330 may be transmitted to the gate output line 332. Wherever three inputs are indicated an enable signal, such as a pulse or steady potential, must exist at each control grid before a signal will appear on the output line.

Normally, flip-flops require negative pulses for operation and gates require positive pulses. However, those skilled in the art will be aware of many types of circuits which may be employed to invert pulses from negative to positive and vice versa. Accordingly, pulse inverters are not shown in the drawings but are implied to be present wherever necessary.

A pulse generating circuit 328 is provided which may be of any conventional variety and designated to produce discrete pulses at a predetermined rate. For example, the pulses may be 25 volts amplitude of 0.15 microsecond duration, occurring at a rate of 10,000 pulses per second. These pulses are employed to carry out the computations based on the transaction involved.

The continuously available pulses from generator 328 are applied over line 330 to the previously mentioned gate 326 and following the opening of gate 326 by flip-flop 322, a train of these pulses is available on line 332. The pulses on line 332 are first applied to an electronic switching circuit (flip-flop) 334 through gates 336 and 338. Assuming switch 334 to be normally in its 0 position, gate 336 will be opened over line 340 and the first pulse appearing on 332 will be transmitted over outgoing line 342. However, the first pulse will also be applied over line 344 to throw switch 334 to its 1 position. Accordingly, gate 336 will be closed, but gate 338 will be opened over line 346. Therefore, the next following pulse from generator 328 will be available over outgoing line 348 rather than line 342. Also, the pulse on line 348 will rethrow switch 334 over line 345. From the operation of this circuit, it will be apparent that pulses from generator 328 will alternately appear on lines 342 and 348.

The pulses on line 342 are also applied over a line 350 to the input of a thyratron ring counter 352 and these pulses will serve to advance the ring counter through its cycle. A suitable thyratron ring counter may be understood with reference to High Speed Computing Devices, by the Staff of Engineering Research Associates, Inc., McGraw-Hill Book Company, 1950, Figure 3–6, page 22. The output from each stage of the ring counter is then connected as an enable line to one of a group of gates 354–361. The second enable signals to gates 354–361 are supplied directly over line 342. Thus, gates 354–361 will be enabled in sequence, the enable signal being stepped from gate to gate upon the occurrence of each pulse over lines 342–350. Binary counters and binaryto-decimal or like translator matrices may also be employed at this point.

From the pulse distributor as thus far described, it will be apparent that upon the occurrence of each pulse on line 342, a pulse will be transmitted through one of the gates 354–361 in sequence, starting with gate 354.

The outputs of gates 354–360 are each inter-connected by blocking crystal diodes 362, these diodes being so oriented that a pulse may travel from the output of a lower-numbered gate to a higher-numbered gate of group 354–361, but not in the reverse direction. That is, a pulse on line 342 transmitted through gate 354 will appear at the output of all of the gates 354–360. However, a pulse of line 342 transmitted to gate 360 will not appear at the outputs of any of the gates 354–359.

The outputs of gates 354–360 are respectively connected as one enable of a group of gates 364–370. The second enable signal of gates 364–370 is provided by the energization of one of the conductors of the "No. of seats involved" line of the transaction command register 224. These enabling signals are carried over line 372 from the register 224. Since in the present example the transaction is to inquire if four seats may be reserved, the conductor within line 372 representing four seats involved is energized and this conductor in the computer pulse distributor 318 is connected as the second enable to gate 367. It will be noted that gate 367 is the fourth gate of group 364–370. Due to the action of the previously mentioned blocking crystal diodes 362, four of the pulses on line 342 will be available on an output bus 374. However, all pulses on the line 342 in excess of four will be suppressed by closed gates 364–366 and 368–370, combined with the blocking action of diodes 362. The bus 374, which is commonly connected with the output of the gates 364–370, is connected with an outgoing line 376 which supplies the predetermined number of pulses (which are hereinafter termed counting pulses) from the pulse distributor 318 to actuate the previously mentioned counters 310. The use of these counting pulses will be described below.

Following the counting off by the ring counter 352 of a sufficient number of counts to bring the counter enable signal to gate 361, a final pulse from line 342 is transmitted through gate 361 over a compose answer line 378. The purpose of the compose answer pulse on line 378 will be described below. Connected to line 378 is a line 380 which is employed to stop the flow of counting pulses through gate 326 and is also used to reset the switch 334 to 0 for the next transaction. The pulse on line 380 may be applied through a fixed delay circuit 382, if desired, and from delay circuit 382 is applied over line 384 to set flip-flop 322 to 0. This pulse is also applied over line 386 to set the switch 334 to 0. The computer pulse distributor will have thus completed its cycle and will not recycle until another starting signal appears on line 316. The counter 352 may be adapted to just complete its full cycle and will be "reset" upon completion of the compose answer pulse on line 378, or reset may be guaranteed by a reset pulse applied over a line 386' connected with line 386.

In addition to the counting pulses produced over line 376, the computer pulse distributor 318 also has provision for supplying a series of what are termed check pulses over previously mentioned outgoing line 348. As described above, the pulses on line 348 alternate with the pulses on line 342. The occurrence of the counting pulses and check pulses may be observed by the wave forms indicated in Figure 11. The start pulse and compose answer pulse are also indicated by wave froms in this chart. The check pulses following the required number of counting pulses are ordinarily not suppressed since the occurrence of a surplusage of these pulses will not affect the operation of the computer.

Provision is also made in computer 225 for producing over a line 388 the first of the counting pulses. This single counting pulse is obtained by connecting line 388 to the line 389 interconnecting the output of gate 354 and the first enable of the gate 364. The single counting pulse on line 388 is normally employed to advance a counter (to be described below) associated with the plane capacity register.

Referring again to Figure 9, the counting pulses on line 376 are applied as the first enable to each of four gates 390–393. The second enable to each of the gates 390–393 is provided over previously mentioned line 302 which carries signals indicating the flight legs involved from register 258. The gates 390–393 accordingly control the application of counting pulses to only the flight legs involved. For the purpose of the present example, in which only one flight leg (as represented by line 296) is involved in the sequence number, it will be assumed that only gate 390 is opened. The counting pulses passing through gate 390 will be applied over line 394 to the counting pulse input of the arithmetic counter 310, shown in detail in Figure 10.

It will be recalled from the foregoing that the counter 310, made up of the stages 312, has been set to indicate a binary number and has retained this binary number indicating the seats available in the particular flight leg involved. The counter 310 is set either to add or subtract according to the transaction involved. In the present example, the transaction is to inquire if seats may be subtracted. Accordingly, referring to Figure 9, the lines from the transaction command register 224 not only are set to enable the "multi-inquire" and the No. 4 line of the "number of seats involved" line, but also the "reserve" line. The "reserve" and "cancel" lines from the command register 224, which are designated as lines 396 and 398, respectively, are connected over branch lines 400 and 402, respectively, to a counter add or subtract set switch 404. In Figure 9 (9A), the switch 404 is indicated separately and is interconnected to each of the arithmetic unit counters in each flight leg involved. However, for the sake of simplicity, the switch 404 is shown within a dash line in Figure 10, it being understood that the output lines of the switch may also be applied to other of the counters, as shown in Figure 9. The "reserve" (subtract) line 400 is connected to a relay coil 408 of switch 404 and when this coil is energized over line 400, a source of positive potential will be applied to a subtract line 410 of counter 310. On the other hand, when it is decided to perform a cancellation transaction (which will be described below), line 402 is energized and this line being connected to a second coil 412 of switch 404 will apply the just mentioned positive potential to an add line 414 instead of the subtract line 410.

Since the reserve transaction is being illustrated, line 400 will be energized at register 224 and the counter 310 will be set to subtract.

It will be apparent from the circuit appearing in Figure 10, that the first counting pulse arriving over line 394 will set back the count in the stages 312 by one, the second counting pulse will retard another one and so forth until the four counting pulses have subtracted four from the number originally at the counter stages 312.

The output of the counter 310 will continuously appear on a line 416 which separates into three branch lines 418, 419, and 420. The source of the output of the counter may be understood with reference to Figure 10, wherein the drawing indicates that line 416 is made up of several conductors, one from each of the two output terminals of each of the counter stages 312. It will be apparent from the foregoing that, following each counting pulse on line 394, the counter stages 312 will retain their characteristic of a register, but the registered number will now be the seat data as reduced by the number of counting pulses.

If the seat data available over line 296 was well above four seats remaining unsold, it will be apparent that four seats may be reserved without introducing any problems of overselling. However, one or two critical situations may exist: The first is that only three seats were available and the reservation of four seats would drive the seats available to −1. The second condition would be that only four seats were available and the reservation of four seats drives the seat data to 0. It is imperative to learn if the seats available have gone to −1 and it may be desirable to know if the seats available have gone to 0. In the latter case, it may be desired to establish a waiting list. To determine the just mentioned conditions, the previously mentioned line 419 is applied to a seats-to-0 coincidence detector 422 and the line 420 is applied to seats-to −1 conditional detector 424. Detectors 422 and 424 will be conventional coincidence detector circuits combined with a gate which will be opened when a coincidence is established between a reference number and the number appearing on the input lines from the arithmetic counter 310. A reference number 0 is applied to detector 422 over a line 426 from a reference register 428 which is set at 0. Similarly, the detector 424 is provided with a reference number of −1 over a line 430 connected with a reference register 432 which is set at −1.

The second enable of the gates within the detector 422 and 424 is provided by check pulses appearing on line 348.

Recalling that a check pulse follows each counting pulse, it will be apparent that, after the first counting pulse has retarded the counter 310 by 1, a check pulse will "probe" detectors 422 and 424 (in the legs involved) and if the number available on line 416 is either 0 or −1, a transmitted multi-check pulse will be available on line 438 or 439, respectively, depending upon the said data originally indicated on line 296.

Since the contents of a counter 310 may produce an undesired conflict (even though not advanced or subtracted by counting pulses) if not in a "leg involved," check pulses are not applied to those of detectors 422 and 424 associated with such counters. On the contrary, the check pulses are screened as to "legs involved" by gates 390′–393′. These gates operate in parallel with gates 390–393, as shown in Figure 9A, their function being to prevent application of check pulses except in legs involved. As an example, check pulses issuing from gate 390′ are applied to detectors 422 and 424 only in the "channel" controlled by input line 296.

If the subtraction of four seats from the seats available did not take the seats available to 0, there will be no transmitted check pulse on line 438, and, therefore, a flip-flop 440, connected with line 438, will remain in its previously cleared condition of 0. The flip-flop 440 is duplicated as at 441 to 442 for each of the legs involved derived from lines 297, 298 and 299. If the subtraction of four seats brought the seats available to 0, a transmitted check pulse will have appeared on line 438 and this will have set the flip-flop 440 to its 1 position. The set condition of flip-flop 440 will enable a conductor in a line 444 which may be employed to initiate a writing operation (described below) in a separate track of the drum 212. The purpose of the writing operation in a reservation transaction will be to indicate that the particular leg involved has gone to 0 and a waiting list is established.

If the subtraction of four seats did not bring the seats available to or through −1, there will be no transmtited check pulse on line 439 and a flip-flop 446 will remain in a previously cleared 0 condition. Accordingly, the 0 output line 448 connected with flip-flop 446 will be enabled and a gate 450 will have its first enabling grid held open by virtue of connection with line 448. The second input to gate 450 is provided over a line 452 which will carry a transmitted compose answer pulse from line 378 whenever a gate 454 is enabled for passing the answer pulse by reason of being enabled over a line 456 which is the "cleared" or 0 output line of a flip-flop 458. The status of flip-flop 458 is determined by whether one or more of the trip legs involved had previously gone to 0 and had a waiting list established which waiting list furthermore was closed. In other words, the compose answer pulse which could have been applied directly to gate 450 is actually "screened" through gate 454 under control of the waiting list flip-flop 458. Normally, where the seat data from one of lines 296–299 was originally sufficient to take care of the subtraction of four seats, there should have been no waiting list involved, but the just mentioned screening circuit will serve to indicate if a previous "waiting list closed" record has not been removed.

With gates 454 and 450 opened, the compose answer pulse on line 378 will proceed through gate 450 and be available on an output line 460 and this pulse will be applied to establish conduction in whichever of thyratron register circuits 464–466 may be enabled for conduction. The register stages 464–466 will be selectively enabled over a line 468 interconnected with a trip No. translator matrix 470 (Figure 9E) which designates the trip number of the group of trips under inquiry. Translator matrix 470 may be of the type shown in U.S. Patent No. 2,473,444. By use of a circuit, as shown in Figure 8 of that patent, a binary input may be converted to a signal on one of *n* leads. For use in the present circuit, line 468, leading from the matrix to the thyratron stages 464, etc., will include the *n* output leads. The input to the matrix will be provided by a register 471 which records the trip No. read from the catalog drum 210. Signals from the trip No. tracks of drum 210 are gated and applied to register 471 over line 471′, and the output to the translator 470 is over line 471″.

It will be recalled that thus far in tracing the present example, only sequence number 0 has been involved and, therefore, only a single register stage, such as 464, will be enabled. That is, if sequence No. 0 happens to be flight No. 1 (although it may be another flight No.), stage 464 will be enabled. With stage 464 conducting a line in multi-inquire, reply register 472 (Figures 6 and 9) will be energized, indicating that space is available for trip number 1.

It will be understood that the multi-inquire reply register 472 will contain a sufficient number of indicator sections, so there is one section for each of the trips involved in any group. In other words, the register 472 will be divided into groups and each group will be subdivided into trips. The indicating means for each trip may include a steady white light for space available; a flashing white light for waiting list available; and a red light for trip closed. This arrangement is indicated by legends in Figure 9. As shown in Figure 6, register 472 connects with computer 225 over line 472′.

Returning to flip-flop 446 of Figure 9, if detector 424 indicated that during the counting pulses the seats available in any of the legs involved went to or through −1, a transmitted check pulse would have appeared on line 439 and the flip-flop 446 would have been activated so that its output 1 line 474 would be energized and 448 cut off. A gate 476 connected with line 474 would now be opened and the gate 450 closed. This transition simply causes the transmitted compose answer pulse to appear on line 478 connected with the output gate 476 rather than on the previously mentioned line 460. This occurs since one input of gate 476 is connected with line 452. The pulse on line 478 is applied over branch line 480 to establish conduction in whichever thyratron register circuits 482–484 may be enabled over line 468. Thus, if a waiting list is available, the previously mentioned flashing white light in each of the trip indicators of the multi-inquire answer register 472 will be enabled for possible energization instead of a steady white light indicating space available. The flashing white light will indicate a waiting list available, and the waiting list will be established because the seat available count in going to −1, has also gone through 0 and has permitted a transmitted check pulse on line 438. The actual creating of waiting lists will be described hereinbelow.

In both of the just traced examples through flip-flop 446 it was assumed that gate 454 was opened, meaning that a waiting list was not previously involved. However, the reading from the drum 212, which produced the seat data over lines 296–299, also may have produced signals over line 300, indicating the fact that an existing waiting list was previously closed. While a more complete description of waiting list circuitry will appear hereinbelow, it will be mentioned here that data indicating closed waiting lists will be screened by gates 486–489 controlled over lines 302 (Figure 6G) and its branch line 307 by the legs involved register 258. Any pulses available through gates 486–489 will be collected on line 492 and this pulse will have actuated flip-flop 458 to its 1 position, so that its output 1 line 494 will be energized rather than line 456. A gate 495, having one input connected to line 378 and its other input to line 494, will then be opened rather than gate 454 and the compose answer pulse will be transmitted over output line 498 rather than appearing on line 452. Line 498 is gated either through a gate 496 or 504 and, if transmitted through gate 496 (to be described below), the pulse transmitted through gate 496 will appear on line 499 and will be applied over branch line 500 and this will establish conduction in which ever of trip closed thyratron register circuits 502–504 may be enabled over line 468.

From the foregoing, it will be apparent that, for sequence number 0 an answer will appear in the register 472 relating to a designated one of the trips of the selected group of trips, the subject of this multiple inquiry. This answer will either indicate space available, a waiting list available, or that the trip is closed. This answer will be in reply to the number of seats involved, as set in the command register 224.

The system is now advanced to the second sequence number (sequence number 1) to provide a reply for the second trip in sequence of the group under inquiry. This is accomplished by applying the compose answer pulse on line 378 over a branch line 506 (adjacent computer pulse distributor 318, Figure 9C) through a suitable fixed delay circuit 508 and then over line 510 to one input of gate 512. The gate 512 will be otherwise enabled by virtue of connection to the multi-inquire line of transaction command register 224 over line 516. With gate 512 thus open, the compose answer pulse will have proceeded from line 506 to a line 518 which may be termed the "advance sequence counter" line. The pulse on line 518 will be connected to advance the previously mentioned sequenc counter 252 and also will be connected over previously mentioned line 236 to restart the single coincidence gated timing pulse generator 240 of the catalog drum 210. A crystal diode 518' may be connected between lines 236 and 518 to permit pulses on line 518 to proceed on line 236, but prevent the reverse flow of pulses. Otherwise, the "start transaction" pulse from circuit 230 would advance the sequence counter 252.

A line 520 may be connected with line 510 to clear all circuits except the answer registers and the sequence counter 252. However, line 520 is connected with the various clearing circuits through a relay arm 520' which is arranged to be in contact with line 520 only if a multi-inquire transaction is under way. The reason for arm 520' will appear below.

Following the advance of the sequence counter 252, the system will go through another complete operating cycle except this time the trip of the group involved will be the trip according to the next higher sequence number. In other words, the system will now report the status of seats available on the second trip of the group involved.

Trip numbers may or may not correspond to sequence numbers. In general, the placing of the sequence numbers will be dictated by the sequence on drum 212 of flight numbers involved. The arrangement of the flight numbers on the drum 212 is taken to control the sequence of catalog look-up because this technique may make it possible to make a multiple inquiry through a complete group of trips within one revolution of drum 212; the sequence numbers are assigned to accommodate storage drum 212 look-up. However, it will be understood that this arrangement is not absolutely necessary.

The system will continue to review all of the trips involved in the particular group and indications as to the status of each trip will appear on the multi-inquire answer register 472. The operator may ascertain which trip may be used by simply glancing at the indicating lights under the group involved and look down the list for the first steady light. He may then inquire of the prospective customers if that trip is satisfactory. If not, he may advise of other trips showing a steady light indicating space available. If none of these are satisfactory, or if no steady lights are available, then the preferred trip having a waiting list available may be selected.

It is expected that each group will have a different number of trips involved and automatic means may be provided for indicating when the machine has completed searching through the group of trips. However, for simplified operation, the system will continue to advance through the sequence counter until a sequence number is established at the counter which finds no counterpart in the sequence tracks of the drum. The machine will then stop functioning. However, since the operation of the system in searching through as many as a dozen sequence numbers will be a matter of a few seconds at most (often within one revolution of drum 212, viz., 0.26 second), the operator can simply wait until no further trips in register 472 are becoming lighted. The indicating means of the trip in the answer register 472 in excess of the number of sequence numbers in the group involved will simply not show any indication.

Sequence counter 252 may be made up of binary stages in the manner of counters 310 to provide ready means for producing binary coded numbers for use in coincidence circuit 218.

When the answers have been reported to the prospective customer and a decision has been reached, the "transaction complete" line from the command register 224 may be energized and this line may be connected to clear all of the thyratron stages in the output register. The system is then ready to be employed in further transactions. The signal available from the transaction complete line of the command register 224 is applied to the thyratron stages over a line 522 and this signal may be also applied over an extension line 523 to reset the trip sequence counter 252 to 0. Or, as an alternative arrangement, the register stages 464, etc., may be actually located at the central station and act as an intermediary register, feeding a register at the remote stations. The thyratron output registers 464–537 would then be cleared immediately, so that other remote stations could have access to the central system.

Following the multi-inquire transaction just completed, it will now be assumed that the next transaction will be to actually reserve four seats on the trip selected. However, it is not necessary to first go through a multi-inquire transaction. A reserve transaction will be set up in command register 224 by energizing the "reserve" line, the No. 4 line of the "number of seats involved" line, and the "start transaction" line. The group register 222 will remain set at the group previously involved, but now the trip register 223 will be set to the trip number selected from the group of trips which are previously reviewed. In this transaction, the sequence counter 252 and the sequence number tracks on drum 210 are not employed, but, instead, the trip register 223 is employed with the trip tracks on drum 210. The transfer from the sequence tracks to the trip tracks gate group 254' may be controlled by a single pole double throw arm of relay 524 (Figure 9C) which applies a positive enabling signal to a line 526 when neither the reserve or cancel lines are energized (that is when the multi-inquire line is energized), but which applies the energizing potential to a line 528 when either the reserve or cancel line is energized. Line 526 enables gates 254 and line 528 enables gate 254'. Relay 524 is energized by connection of two separate coils 525 and 527 to reserve and cancel lines 396 and 398, respectively. Relay arm 520' is also controlled by relay 524.

With the system setup as just described, a coincidence pulse from detector 218 will be produced in the manner hereinabove described upon the first occurrence of the desired drum line passing beneath the reading transducers.

The catalog system will accept group and trip numbers and, accordingly, look-up flight number and trip legs involved which information will be used, in conjunction with date to locate the desired item in main storage 212. The actual "reserve" operation in main storage will now take place in two steps: (1) a reading and computing operation, or inquiry, as to whether the space is available as desired, and if so, (2) a writing of the computed data into storage, this writing operation comprising the actual act of reservation. It will be noted that two references to storage 212 are involved, one for inquiry (reading) and the next reservation (writing). The inquiry operation, here, is the same as respects storage drum 212 and the computer as a single step of "multi-inquiry," previously described.

As an example, the system will subtract four seats from the legs involved in the particular trip selected in exactly the manner previously described above in connection with any given sequence number in the multi-inquire transaction. However, in this instance, the compose answer pulse will be employed to energize writing circuits which will actually write into the storage drum 212 revise seat data according to the reservation transaction which is taking place. In addition to writing the revised data into the main storage drum, the compose answer pulse will also be available to indicate the result of the transaction in the "transaction command reply register" 530. Register 530 is illustrated in block form in Figure 6, but the details of the register may be best understood with reference to Figure 9, where the lines leading to the register are indicated within the bracket designated by numeral 530. This register connects with computer 225 over line 530', as shown in Figure 6. Register 530 comprises indicators adapted to indicate results of commands to reserve and cancel. These portions of register 530 are appropriately indicated by legend in Figure 9. The "reserve" portion of register 530 comprises lines adapted to indicate (1) that the system has reserved, (2) that a waiting list is available, and (3) that the trip is closed. The waiting list available and trip closed indicators will be useful if a patron specifies a given trip and no multi-inquire transaction is previously carried out. These three lines which are appropriately indicated by legend in Figure 9, correspond to the groups of indicators in the multi-inquire register 472.

In the register 530, each type of signal is controlled by one of thyratron register stages 533–537. These register stations are similar to thyratron register stages 464–504, except that a second enable under the control of the sequence circuits is not necessary.

The waiting list available and trip closed lines of the reserve portion of register 530 will be operated from the same lines 478 and 498 which operated the lines of similar function in the multi-inquire register 472. However, the line indicating completion of a reservation is not necessarily controlled by the space available line 460, but instead may be under control of a signal appearing on line 540, indicating that the writing circuits have actually written revised seat data into the storage drum 212 to replace the previously existing seat data numbers.

The signal on line 540 results from the following operation: The compose answer pulse, as gated through gate 450, indicating that space is available, is applied over a line 542 branching from the line 460. The transmitted compose answer pulse on line 542 is then passed through a gate 544 which is otherwise enabled (1) by connection to line 396, which proceeds from the reserve line of command register 224, and (2) over line 545 from the "initiate writing" line of transaction command register 224. The compose answer pulse as transmitted through gate 544 may be now considered an initiate write pulse, this pulse appearing on line 546. Line 546 proceeds from the computer to a single coincidence gated timing pulse generator 548 (Figure 6) and the pulse on line 546 is employed to set the generator 548, so that the next coincidence gated timing pulse obtained from detector 220 of storage drum 212 will be applied over line 550 and through generator 548 to trigger seat data writing circuit groups 552–555. The output signal from generator 548 will be applied to each of the writing circuits over triggering line 558.

Line 540 is also connected over branch line 540' to a contact 541 associated with relay arm 520' which engages arm 520' only when a "reserve" or "cancel" transaction is under way. This arrangement prevents clearing of the various circuits until a writing operation takes place. Otherwise, the compose answer pulse on line 510 would interfere with the writing operation, as will become more clear hereinbelow.

A determination of the numbers which will be written by the writing circuits 552–555 will be achieved by signals obtained from the arithmetic unit counters 310, representing the number of seats available as altered by the computing action. These signals will be available over lines 560–563 (Figure 9). The origin of lines 560–563 may be best understood with reference to Figure 10, wherein the lines from each 1 output terminal of flip-flop counter stages 312 are collected within the line 560. Since each of the conductors in line 560 extends from each stage from the counting and register stages 312, the conductors in line 560 indicate in binary coded fashion the presetting of writing circuits 552–555. A detailed explanation of the control of the writing circuits appears hereinbelow.

The pulse appearing on line 558, which serves to trigger the writing circuits 552–555, also is employed to establish the steady white light indicating "has reserved" in the reserve portion of register 530, this indicating that the system has actually written the revised seat data into the main storage drum 212. The just mentioned function is performed by reason of the connection of line 558 to line 540, the last mentioned line serving as the triggering circuit for register stage 534 in the reply register 530. Accordingly, each time seat data is revised by a selective alteration writing action, the signal appearing on line 540 will energize the "has reserved" signal in the reserve portion of the reply register 530. It will be noted from the circuit in Figure 9 that a pulse on line 540, indicating that the system "has written," will also energize the "has cancelled" signal in the cancel portion of register 530. However, the portions of register 530 not pertinent to the particular transaction may be otherwise disabled by any convenient means.

Another transaction which may be carried out with the aid of the computing and checking process is cancellation of seats previously reserved. This involves the "cancel" portion of the command reply register 530. The transaction is established the same as a "reserve" transaction, except by enabling the "cancel" line in the command register 224 rather than in the "reserve" line. It will be recalled that the "cancel" line is connected over lines 400 and 402 to the counter add or subtract switch 404 and the energization of lines 398 and 402 will set the arithmetic counters 310 to add rather than subtract from the seat data. Following a counting operation, the increased number of seats available, as indicated on previously mentioned lines 418, will be applied to over-cancellation conditional detectors 566. These detectors are employed to indicate whether, while four seats (or *n* seats) are being added to the seats available, the plane capacity should be exceeded. An indication of such an event will be useful as a check on the previous handling of reservations in the particular trip involved and, in particular, will show if perhaps the number of seats in a previous transaction cannot be fulfilled. The detector 566 cannot be supplied with a standard reference number (such as the 0 or —1 supplied to detectors 422 and 424) because the plane capacity may be different from one flight to another. Also, in the event that the seats available, as revised for a preceding transaction, may have come out equal to the plane capacity, it will not be possible to directly compare the seats available with the plane capacity as present in the plane capacity register 290. Accordingly, the plane capacity, as available over line 292 from plane register 290, is inserted into a plane capacity counter 568. This counter will be substantially similar to the counters 310, as illustrated in Figure 9, except that for use at 568 provision is necessary only for adding a single pulse. In operation, the first and only the first counting pulse is obtained from line 389 (Figure 11) and applied over line 388 to the counting pulse input of counter 568. Therefore, the plane capacity will be increased by 1 and the resulting number will be applied over line 570 to the coincidence detectors 566 to be compared with the seats available indicated on line 418. As an example of operation, if the plane capacity is 60 and 60 seats are indicated as available on line 418, the first counting pulse will advance the number on 418 to 61, simultaneously advancing the plane capacity on line 570 to 61. The next following multi-check pulse appearing on line 348 will result in a transmitted multi-check pulse on line 572. The pulse on line 572 will provide an indication that an overcancellation will occur. The line 572 is connected as one input of a flip-flop 574 which will control over lines 576 and 578, respectively, whether gate 580 on the one hand or gate 584 on the other hand will be opened for transmission of a compose answer pulse.

Assuming first that no pulse appears on line 572, the flip-flop 574 will remain in its previously cleared 0 condition and line 576 will enable the gate 580. In this case, a compose answer pulse will proceed directly through gate 580 from line 378 and will appear on line 586 at the input of a gate 588. The gate 588 will be otherwise enabled by branch line 590 connected with "cancel" line 398 of the command register 224. Since a cancellation transaction is underway, gate 588 will be opened and the compose answer pulse will proceed on previously mentioned initiate write line 546 and the revised number of seats available will be written into the drum 212 by selective alteration techniques in exactly the manner that writing took place during the previously described reservation transaction.

If, contrary to the foregoing, a pulse does appear on line 572, indicating an overcancellation, than flip-flop 574 will be actuated and gate 584 (rather than gate 580) will be opened over line 578. The compose answer pulse will then not be available to initiate a writing operation, but instead the compose answer pulse available to gate 584 over a line 592 will appear on line 596, proceeding from gate 584, and this will trigger thyratron stage 533 in register 530 to light a red light in the cancel portion of register 530, indicating an impossible transaction.

The character and use of the previously mentioned waiting list circuits will now be described in detail:

While waiting lists containing information as to the number of persons on the list are within the scope of this invention, the specific example being given contemplates that the number of persons on a waiting list will be determined by a waiting list operator located at the central station.

As will be described more fully below, a waiting list is established automatically in a leg when that leg "goes to 0" in coincidence detectors 422 in a "reserve" transaction which is successfully carried out.

After a waiting list has been established, the list may later be closed after a predetermined number of proposed reservations are entered therein. The waiting list operator decides when no more patrons should be listed, and he enters information into the main storage drum 212 that the waiting list is closed.

It will be recalled that upon completion of an unsuccessful reserve transaction, the remote station operator is advised either that a waiting list is available or the waiting list is closed (trip closed). If the former, the waiting list operator may be advised by separate wire to list, or automatic means may be provided to instruct a listing. Use of the simpler separate wire means has considerable utility, since no contacts will be made with the waiting list operator if any of the lists are closed.

The automatic establishing of waiting lists will now be described in detail: It will be recalled that, whenever any leg goes to 0 seats available, a transmitted check pulse will appear on the line 438 leading from those detectors 422 which are involved. These pulses are employed to set those involved of flip-flops 440–442 to their 1 position. The 1 outputs of flip-flops 440–442 are then connected over line 444 as enables for writing circuits 600 which, when triggered, will write into associated tracks that a waiting list exists in an associated flight leg.

The writing circuits 600 are triggered for writing in the following manner: The screened compose answer pulse available on line 460 (the result of a successful reservation transaction) is applied over a branch line 602 to a gate 604. The second enable of gate 604 is applied over line 606 from the "establish waiting list" line of command register 224. Gate 604 may be provided merely as a means of permitting the remote operator to prevent waiting lists being established if such is the desired use of the system. Line 606 is preferably interlocked with "reserve" line 396 to prevent gate 604 from being opened, except on a "reserve" transaction. This may be done by feeding line 606 through the "reserve" switch in register 224. Normally, waiting lists will always be established on successful "reserve" transaction during which one or more legs go to 0 seats available.

Gate 604 and line 608 (and SCGTP generator 610) may be eliminated (and line 558 connected to line 612) if no separate control over waiting list writing is desired. The output of gate 604 is then applied over line 698 to set up a single coincidence gated timing pulse generator 610. The gated timing pulse which issues from generator 610 upon the occurrence of the next arrival of the desired row under the transducers of drum 212 is applied to the triggering input of writing circuits 600 over line 612. The waiting list is thus established. It will be noted that a waiting list will not be established on every successful reserve transaction because of the screening action of flip-flops 440–442; the legs must go to 0 first.

When the waiting list operator at the central station decides a waiting list should be closed, this is done in the following manner: Knowing the flight number and date, or index number, of the trip on the drum 212 (see Figure 8), the operator may use an auxiliary coincidence circuit 614 (Figure 6) to produce coincidence gated timing pulses on a line 616, these pulses being produced in response to an index number set into circuit 614 over a line 618 connected with an index number register 620 at a waiting list operator's station 622 (Figure 9). The pulses on line 616 are then applied to trigger a single coincidence gated timing pulse circuit 624 (Figure 6) to trigger "waiting list closed" writing circuits 626 over line 628. A triggering pulse will appear on line 628 when a triggering line 630, connected between circuit 624 and station 622, is enabled by means of a "close list" switch 632 at station 622.

If the waiting list operator should desire to close the waiting lists of only some of the legs of a particular trip, such legs may be selected by means of control switches 634 at station 622, there being one switch 634 for each possible leg. Enabling signals from switches 634 may be applied to writing circuits 626 over line 636.

Use of the "waiting list established" and "waiting list closed" flux cells available for reading from the drum will now be described.

The waiting list signals are employed in the example being given herein to screen the replies to "reserve" transaction to insure against (1) the "waiting list available" signal (flashing white light) in register 530 being lighted when in fact the list has been closed, and (2) the "trip closed" signal (red light) of register 530 being lighted when in fact no waiting list exists. Extension to other screening techniques will be apparent.

It has hereinabove been explained that a compose answer pulse on line 378 is transmitted through gate 495 when any one of the "waiting list closed" reading gates of gate group 284 transmits a signal. Gate 495 is controlled by flip-flop 458, which is activated to open gate 495 upon occurrence of a pulse on line 492. It is also described above that a pulse transmitted through gate 495 is also screened by a gate 496.

Gate 496 is under control of the 1 output side of a flip-flop 638, this flip-flop being set to 1 over line 640 upon the occurrence of a "waiting list established" pulse in any one of the legs involved as transmitted through gates 642–645. Gates 642–645, as well as previously mentioned gates 486–489, are selectively opened under control of the legs involved register 258. This control is over line 307 branching from line 306 within Figure 9. Line 301 carries the signals from reading gates 286 to gates 642–645.

It will be noted that the provision of gate 496 controlled as stated prevents a "trip closed" reply when no waiting list has been established. It has previously been described how gate 454 screens the input to gate 476 and, therefore, prevents a "waiting list available" reply when a waiting list has been closed. Of course, where a trip may be closed for other reasons than a waiting list, gate 496 may be dispensed with.

The "screening" circuits described above are simply intended to be illustrative of the many types of such circuits which fall within the scope of this invention. In addition to drum controlled screening circuits, there also may be gates operated by the operators for such purposes as are desirable.

From the foregoing, it will be apparent how many varieties of screening circuits may be developed by the inclusion of the "waiting list established" and "waiting list closed" features of this invention.

Suitable writing circuits have been described hereinabove with reference to Figure 4. It will be understood that a writing circuit is required for every track in which information is to be written. Therefore, writing circuit groups 552–555, 600 and 626 of Figure 6, are actually made up each of a plurality of circuits of the type shown in Figure 4. As mentioned above, writing circuits for use in the writing circuit groups 552–555 require control as to whether a 0 or a 1 will be written.

For use as circuits 600, relay 162 of Figure 4 will be energized over line 444 and relay 144 will be bridged. Then, during each successful "reserve" transaction, 0's will be written to maintain the track in a clear or "no list exist" state. However, if the leg goes to 0 in such transaction, relay 162 will cause a 1 to be written, denoting that a waiting list exists. Moreover, if subsequent "cancel" transactions should restore seats available above 0, an attempted reserve transaction will be successful if the waiting list has not been closed, no legs will go to 0, and failure to energize relay 162 over line 444 will cause a 0 to be written, thus effectively erasing the list exists signals. Gate 496 will then prevent "trip closed" replies on the multi-inquire and reply registers 472 and 530, respectively, should the waiting list operator now erroneously close the waiting list on the drum. The remote operator can call this situation to the attention of the waiting list operator. The remote operator may be appraised of what has happened by means of a signal "cancelled waiting list remains closed" in the register 530. This signal may be established through thyratron relay 535 (Figure 9) which, in turn, is triggered over line 702 extending to gate 704. Gate 704 is enabled by the 0 side of flip-flop 638 and is thus able to transmit on line 702 a "trip closed" pulse screened through gate 495 and appearing on line 498.

Referring again to Figure 4, for use as circuits 626, coil 170 will be energized over line 636 and will write 0's and 1's depending on the setting of switches 634. Writing action will take place only when switch 632 is closed, which is at the discretion of the waiting list operator.

A desirable addition to the above described system, or other similar systems, may be to utilize otherwise unused space on the drum surfaces. An arrangement for doing so will now be described, this being referred to hereinafter as a "data split" feature.

In a typical airlines system, for example, some flights will involve a large number of flight legs, while other flights will involve a relatively few number of legs. As one example, a certain flight may involve nine flight legs. In other words, the flight may be the basis for trips made up of up to nine legs. On the other hand, another flight may involve only three legs. Therefore, it is obvious that, to have a complete row of the storage drum surface devoted to a given date for trips involving only a few legs means that there is a considerable waste of space on this drum surface. To overcome this and yet permit some trips to involve a greater number of legs, data for more than one date or the like for a flight having only a few legs can be stored in a single row of the storage drum.

As an illustration, it may be assumed that the system circuitry will be adequate to handle up to nine flight legs, that is, in Figure 9A, there may be nine of counters 310, etc. However, there will probably be some flights which will involve up to only three legs. Therefore, data may be consolidated in a single drum row by duplicating information in the row in side-by-side segments.

While there are many possible embodiments of this phase of the herein invention, one typical embodiment will be described in detail. Referring to Figure 7 as a guide, in the catalog drum 210, for a "split" trip involving only three flight legs, marks indicating the particular legs involved may be placed in the first three flight leg columns reading from left to right in Figure 7. Now, referring to Figure 8 as a guide, in the storage drum 212 the seat data for the corresponding legs involved may be placed in side-by-side segments of the row. By so doing, seat data for a given flight for three dates may be in a single row, thus conserving drum space. As an example, referring to Figure 8, assuming that flight 90 involves only up to three legs, data for dates 29, 30, and 31 may be consolidated in one row, thus saving two rows of space.

It will be understood in this illustration that, while a capacity of nine legs is set out, this capacity may be varied according to requirements of the system without altering the invention.

Arrangements for implementing the data split feature will now be described in detail. First, on both the catalog and storage drums, a single track is devoted to carrying flux cells, indicating which rows involve splits. The split rows may be indicated by "1's" and the non-split rows by "0's" or vice-versa.

Referring now to Figure 12, this figure shows "data split" circuits which may be connected into circuits shown in Figures 6A and 6B. Primarily, the circuits shown in Figure 12 may be considered as within a block which could be inserted in the line 302 which extends from the legs involved register 258 of Figure 6B to the computer 225 of Figure 6A. In Figure 12, 810 designates a reading circuit which is connected to a reading transducer in the previously mentioned data split track of the storage drum 212. This circuit will be so arranged that a first output line 812 will be at a relatively low voltage when a split marker occurs, and at a relatively high voltage when no split marker occurs. A second output line 814 will carry the reverse; that is, will carry a relatively low voltage when no split marker occurs and a relatively high voltage when a split marker does occur. Suitable circuit details for circuit 810 will be clear from hereinabove descriptions.

The signals on lines 812 and 814 are first applied over branch lines 812' and 814' to a split marker coincidence circuit 816. Also applied to circuit 816 over lines 818 and 820 are a similar set of split marker indicating signals from a catalog split register circuit 822. The information retained in circuit 822 will be from a reading circuit similar to circuit 810, but responsive to split markers in the split indicator track of the catalog drum 210. Circuit 822 is required because drum 210 will have been read before drum 212 is ready to be read.

A third input to split coincidence circuit 816 is the flight number coincidence pulse which can be obtained from the storage coincidence circuit 220 of Figure 6A. To be more specific, when the data split feature is employed, the coincidence circuit 220 will be replaced with a series of separate coincidence circuits, some of which are within Figure 12 now being described. The first step in obtaining a coincidence pulse for application to line 268 of Figure 6A is derived from coincidence between the flight number as read from the storage drum 210 and the flight number register 256. This flight number is applied to the said third input line 824 of split coincidence circuit 816.

I there is agreement in circuit 816 that a split marker has occurred in both the catalog drum and the storage drum, a gated coincidence pulse will appear on line 826, which is one output line of circuit 816. However, if there is disagreement in circuit 316 as to split markers, an output pulse is available on a second output line 828 for purposes of giving an alarm indicating mismatched split indications.

Assuming circuit 816 is in agreement either that there is or is not a split marker (there is no mismatch), the flight number coincidence pulse now available on line 826 is connected to provide a first enabling signal to two gate circuits 830 and 832. A second enabling signal for gate 830 may be available over a line 834 connected with the previously mentioned line 814, and a second enable for gate 832 is over line 836 connected with line 814.

The flight number coincidence pulse available on 826 will be gated by one of the gates 830 or 832 to appear either on a "non-split" line 838 or on a "split" line 840. Assuming first that there is no split involved, the flight number coincidence pulse will be available on non-split line 838 and this will be applied to a coincidence circuit 842 which compares the tens digits of the date as available from the date reading circuits of the drum over line 844 and the tens digits of the date as available over line 846 from a date tens digit register 848. Agreement as to the tens digits of the date will then permit a combined flight number and date tens digit coincidence pulse to be available on a line 850 leading from circuit 842. Line 850 is the input to a date units digits coincidence circuit 852, this circuit comparing the date units digits available over line 854 from the storage drum date reading circuits and date units digits information available over line 856 from a date units digits register 858. Upon agreement of the date units digits in circuit 852, a combined flight number, date tens digit and date units digit coincidence pulse will now be available on line 268' leading from circuit 852. This line is the equivalent of line 268 in Figure 6A and may be considered as connected thereto.

From the foregoing description, it will be clear that, for no split, the function of coincidence detector 220 in Figure 6A has been performed by the appearance of a coincidence pulse on line 268' of Figure 12.

There is also connected with output line 812 of split indicator reading circuit 810 a line 860 which provides a first enable to a series of gates 862–870. The second enable of each of the gates 862–870 is over lines 871–879 which are an example of nine legs involved lines from the register 258 of Figure 6B. The outputs of gates 862–870 are available on lines 880–888 and these outputs are further connected over lines 890–898, respectively, to form the conductors of the line 302 leading into the computer 225.

From the system as thus far described, it will now be apparent that, where no split is involved, the substitution of the circuit of Figure 12 into the circuits of Figures 6A and 6B has not changed the operation. That is, the legs involved signals, as in register 258, are applied through the gates 862–870 directly to the line 302. The gates 862–870 will be opened for no split because, as previously mentioned, the line 812 and, therefore, line 860, carry a relatively high voltage for the non-split condition.

The case where a split occurs will now be considered. When a split exists, lines 812 and 860 will carry a relatively low voltage which will be sufficient to close the gates 830 and 862–870. However, the line 814 will now carry a relatively high voltage. This will open the gate 832 and will also provide a first enabling signal to data zone interpreter gates 900–902.

The flight number coincidence pulse available on line 826 will now be routed over line 840 and will thus bypass the date tens unit coincidence circuit 842 and instead be directly applied to the date units digits coincidence detector 852. The tens digits of the date are now employed by way of establishing a code to selectively enable only one of the interpreter gates 900–902. To carry out this function, only 0, 1, or 2 are used for definite tens digits; the 31st and dates ending in 0 are not translated into binary-coded decimal digits, but into binary codes not used in that translation. Special advance dates arbitrarily indicated by letters for convenience are also assigned special binary codes. For example, a special code may be as follows:

| | | |
|---|---|---|
| 10=0+10 | 20=10+10 | 30=20+10 |
| A=0+11 | C=10+11 | 31=20+11 |
| B=0+12 | D=10+12 | E=20+12 |

Binary codes for the two terms of each dexter member are used for each representation. The binary codes for the tens digit of the date are then either 01, 10, or 11, and all occur equally frequently.

Referring to register 848 in which the code is set up, there are provided two double throw switches 903 and 904, which may be set up to engage either a "1" or a "0" contact. These contacts are indicated on the drawing. The "1" contact of switch 904 is connected over a line 905 as a second enable to gate 900, and this contact is also connected through a resistor 906 to a source of relatively low potential (minus 30 volts for example). The "1" contact of switch 903 is also connected, through a resistor 906', to the just mentioned source of relatively low voltage and the zero contact of this same switch is also connected to the same low voltage source, through resistor 911. In addition, the "1" contact of switch 903 is connected over line 907 as a second enable for gate 901. The second enable for gate 902 is provided over line 908 connected with the zero contact of switch 903.

As indicated by legend in Figure 12, the gate 902 controls what is termed zone A, gate 901 controls zone B and gate 900 controls zone C.

If the code for a date tens digit is "0", then both of the switches 903 and 904 are set to engage their "0" contacts and a relatively high voltage (+40 volts as an example) is available through resistance 909 to the switch 904. This voltage will then be available over a line 910 which interconnects the zero contact of switch 904 with the switch 903. Accordingly, the line 904 between the gate 902 and resistance 911 connected with the low voltage source will be at a potential intermediate the low and high voltage sources. This comes about because the resistors 909 and 911 act as a voltage divider. This intermediate voltage will be sufficiently high to open gate 902 and, therefore, permit an enabling signal on a line 912 leading from the zone A gate 902. However, gates 900 and 901 will be connected only with the low voltage source and will be closed.

If the code for the date tens digit is "1", the switch 903 will be set to engage its "1" contact and now the gate 901 will be opened and gates 900 and 902 closed. This will place an enabling signal on line 914, leading from the zone B gate 901. If the code is "2", this is 1–0 in a binary system and switch 896 will be set to its "1" position and switch 894 will be set to its "0" position (although it may be to its "1" position without effect). Therefore, only gate 900 will be opened and gates 901 and 902 will be closed. This will serve to provide an enabling signal on a line 916 leading from the zone C gate 900.

The lines 912, 914, and 916, serve to provide a first enable to a group of gates 918–926, which are employed in a manner now to be described to shift the "legs involved" according to which of the zone lines 912, 914, 916 is enabled. The zone A line 912 provides an enabling signal to gates 918–920; zone B line 914 provides an enable to gates 921–923; and zone C line 916 provides an enable to gates 924–926.

The second enable of gates 918–920 is directly provided over the first three lines (reading left-to-right in Figure 12) from the legs involved register 258 of Figure 6A. There are lines 871–873, however, the gates 921–926 are not directly enabled between remaining lines from the legs involved register. On the contrary, gates 921–923 are also enabled over lines 928–930 from the first three lines 871–873. Furthermore, the gates 924–926 are also enabled over the lines 928–930.

Accordingly, it will be clear that for a flight having only one or more of legs 1, 2, and 3, involved will open one of the groups of gates 918–920, 921–923, or 924–926, depending on which zone line carries an enabling signal. Therefore, when there is a data split, as evidenced by a relatively high voltage on line 814, the code established by the tens digits will enable a particular one of the zone control lines 912–914, or 916, and the flight information will be available on one of the three groups of gates. Therefore, the information which flows into the counters 310 of the computer 225 will select the correct segment of the row for computation purposes. It will be noted in Figure 12, that the outputs of gates 918–926 are each connected along with the output of one of the gates 862–870 to lines 890–898 which make up the line 302 leading into the computer 225.

From the above, it will be understood that, by use of the index numbers alone and/or other combinations of data on each drum surface, a supervisory operator may rearrange, add and delete information on the drum at will.

It will be further understood that audible or the like alarms may be "broadcast" from the system as desired. That is, the pulse available when a leg or legs "goes to zero" may not only give rise to an indication in a reply register, but may also sound an alarm.

The system may be checked for accuracy by running test problems between transactions. These may be run with diminished cut-off biasing and/or with one or more of the applied tube potentials at sub-normal values. Malfunctioning under these conditions will serve to discover tubes nearing failure.

It will be understood that, while in most instances tubes are referred to as such, no limitation is intended, since crystal rectifiers, transistors, magnetic amplifiers, coherers, and so forth, may be used instead.

From the foregoing it will be apparent that, basically, the invention provides a system for keeping inventory records and the like, wherein it is possible not only to obtain current information from a central source, but also to record and alter information from remote control stations. The invention, moreover, includes methods and apparatus which provides rapid computing based upon information previously available, with automatic alteration of the information under certain conditions.

The foregoing detailed description has been made only for purposes of illustration and it is not intended that the invention be limited to the embodiments described in detail. On the contrary, it is intended that the scope of the invention be as set forth in the appended claims.

We claim:

1. In a data storage system, storage means for storing indicia representing pieces of data, the storage means comprising a magnetizable means movable in cycles of travel, means to so move the magnetizable means, a group of *n* tracks on the magnetizable means for storing indicia representing information in bits in aligned cells of the *n* tracks, detecting means responsive to data recorded in the magnetizable means for generating a signal indicative of a split of data among said tracks, transducing devices arranged for operation in the tracks, and means connected with the transducing devices and with the detecting means for selectively operating the transducing devices as a single group in *n* tracks or in subgroups each of less than *n* tracks according to a split of indicia representing data in predetermined rows of aligned cells.

2. A space reservation system comprising first and second storage means located in a central station, each storage means comprising a drum having a magnetizable peripheral surface, transducer means operatively associated with each storage means for locating, recording, reading, and altering information in magnetic form on the said surfaces, at least one remote operating station, communications means interconnecting the remote operating station and the central station, means comprising register means in the remote station adapted to locate indicia representing a place of catalog information in the first storage means, means comprising locator means operated by the reading of indicia representing information from the first storage means to locate predetermined indicia representing information in the second storage means, means associated with the second storage means for reading indicia representing information therefrom, means for revising signals representing items of available information a predetermined amount, means including reply register means located at the remote station for indicating the revised items of available information, means for comparing signals representing the revised items of available information with signals representing reference information to provide an indication in the reply register means if the revised items available information has exceeded predetermined limits, the system having indicia representing information stored in the second storage means either in single groups of bits in *n* tracks or in sub-groups of less than *n* tracks according to a split of data, the system further including means designating a split of data and for shifting the recording and reading of information in the sub-groups according to a code pertaining to the identity of the information to be recorded or read.

References Cited in the file of this patent

UNITED STATES PATENTS

| | | |
|---|---|---|
| 1,926,893 | Bryce | Sept. 12, 1933 |
| 2,318,591 | Couffignal | May 11, 1943 |
| 2,540,654 | Cohen et al. | Feb. 6, 1951 |
| 2,549,071 | Dusek et al. | Apr. 17, 1951 |
| 2,587,532 | Schmidt | Feb. 26, 1952 |
| 2,594,865 | Bumstead | Apr. 29, 1952 |
| 2,594,960 | May | Apr. 29, 1952 |
| 2,611,813 | Sharpless | Sept. 23, 1952 |
| 2,623,171 | Woods-Hill et al. | Dec. 23, 1952 |
| 2,636,672 | Hamilton et al. | Apr. 28, 1952 |
| 2,737,342 | Nelson | Mar. 6, 1956 |
| 2,739,440 | Cartwright | June 5, 1956 |

OTHER REFERENCES

Intelex-Automatic Reservations, Mountain and McWhirter; "Electrical Communication," vol. 25, No. 3, September 1948, pages 220–231.

MTAC—"Mathematical Tables and Other Aids to Computation," vol. IV, No. 29, pages 31 to 39, pub. National Research Council, January 1950.